Figure 1:
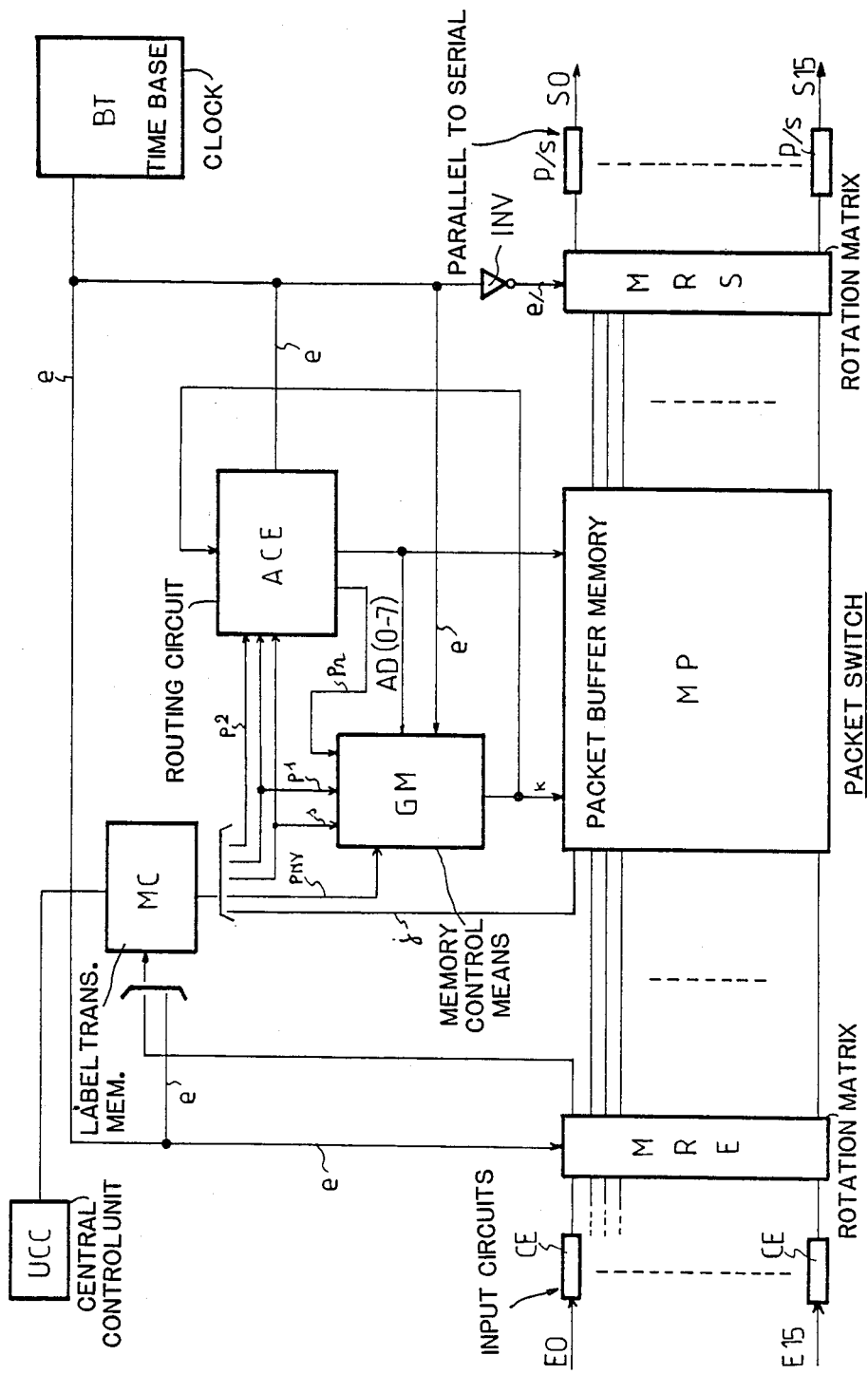

United States Patent [19]

Quinquis et al.

[11] Patent Number: 4,864,560
[45] Date of Patent: Sep. 5, 1989

[54] SYSTEM FOR CHANGING PRIORITY OF INFORMATION

[75] Inventors: Jean-Paul Quinquis; ALbert Lespangol, both of Perros-Guirec; Jacques Y. Kerberenes, Lannion, all of France

[73] Assignees: L'Etat Francais represente par le Ministre des PTT; Centre National d'Etudes des Telecommunications, both of France

[21] Appl. No.: 211,343

[22] Filed: Jun. 24, 1988

[30] Foreign Application Priority Data

Jul. 16, 1987 [FR] France .............................. 87 10254

[51] Int. Cl.⁴ .......................................... H04Q 11/04
[52] U.S. Cl. .................................. 370/60; 370/94.1; 370/85.6
[58] Field of Search ............................. 320/60, 54, 58

[56] References Cited

U.S. PATENT DOCUMENTS 4,621,359 11/1986 McMillen .............................. 370/60
4,707,693 11/1987 Hensel ................................. 370/94

FOREIGN PATENT DOCUMENTS 0033672 1/1981 European Pat. Off. .
0113639 12/1983 European Pat. Off. .

OTHER PUBLICATIONS

European Search Report; FR 8710254; May 27, 1988.
High Speed Switching Network for Multi-Media Information, S. Nojima, et al., pp. 140-150.

Primary Examiner—Douglas W. Olms
Assistant Examiner—Frank M. Scutch, III
Attorney, Agent, or Firm—Laff, Whitesel, Conte & Saret

[57] ABSTRACT

A system for switching information packets assigned with two levels of semantic priority between entering time multiplex lines and outgoing time multiplex lines, a storage address of a packet in a buffer memory of the system being stored in a queueing file associated with each outgoing time multiplex line designated to transmit the packet, comprising a field point (state) memory whose words each are comprised of as many bits as there are outgoing time multiplex lines, the addresses of the the field point memory corresponding to those of the buffer memory, each bit of the words being at "1" when the packets stored at the same address as the words and designated for an outgoing time multiplex line corresponds to a high level semantic priority bit and has not yet been transmitted by the outgoing multiplex line concerned, each packet storage address being chosen from the addresses of the field point memory addressing all bits of which are at "0".

15 Claims, 12 Drawing Sheets

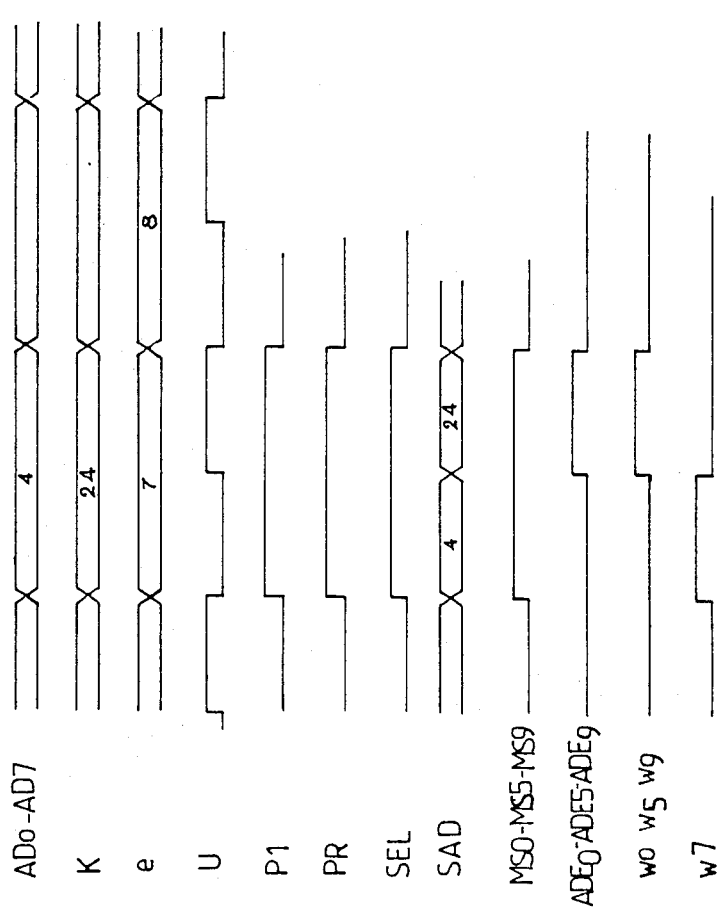
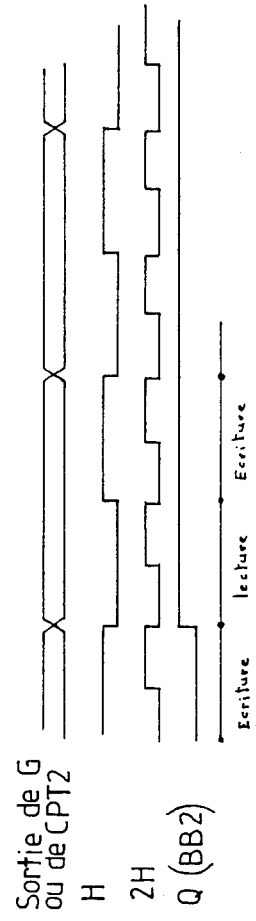
FIG. 3
FIG. 4

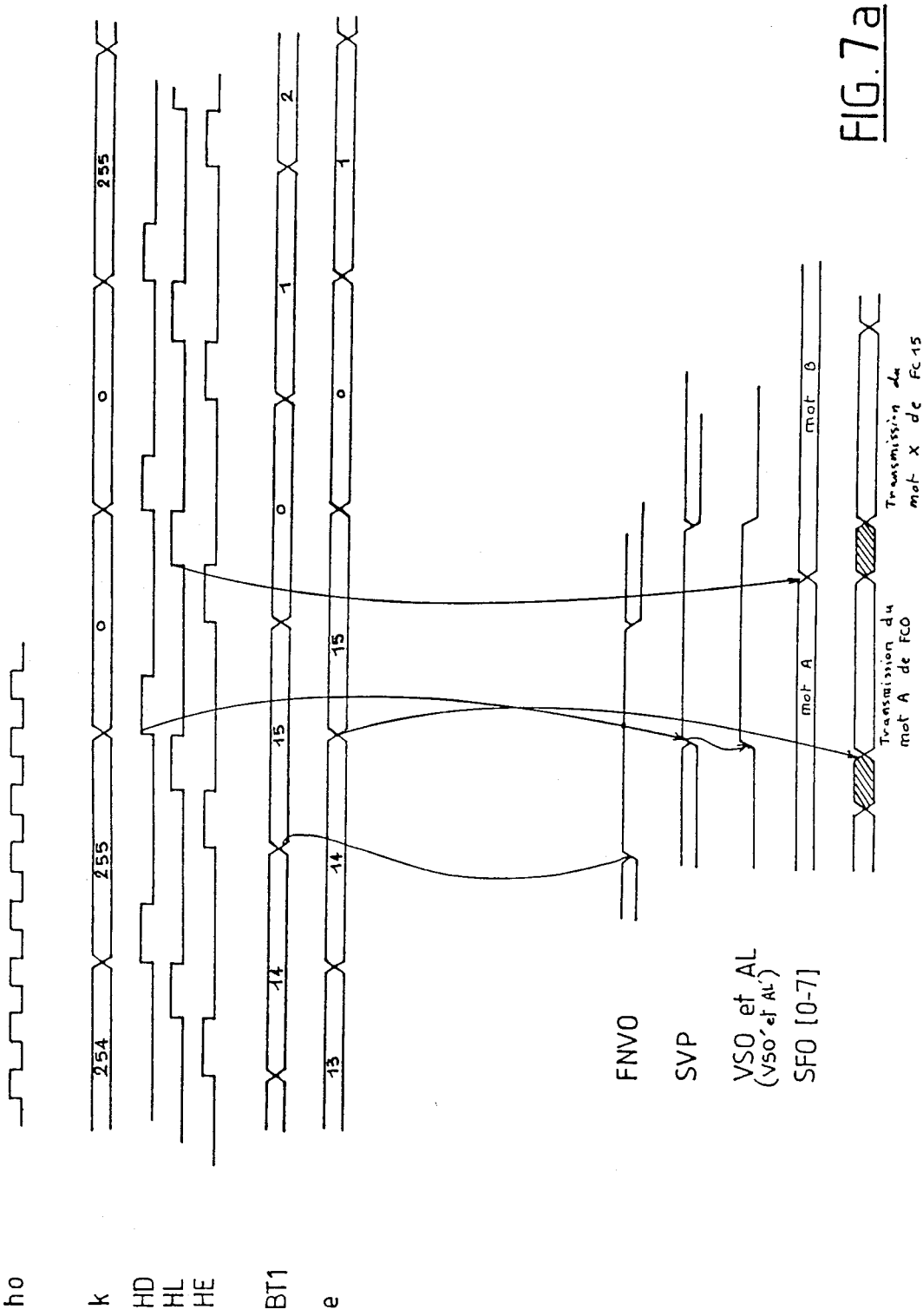

FIG.8b FIG.9b FIG.10b FIG.11b FIG.7b FIG.12b

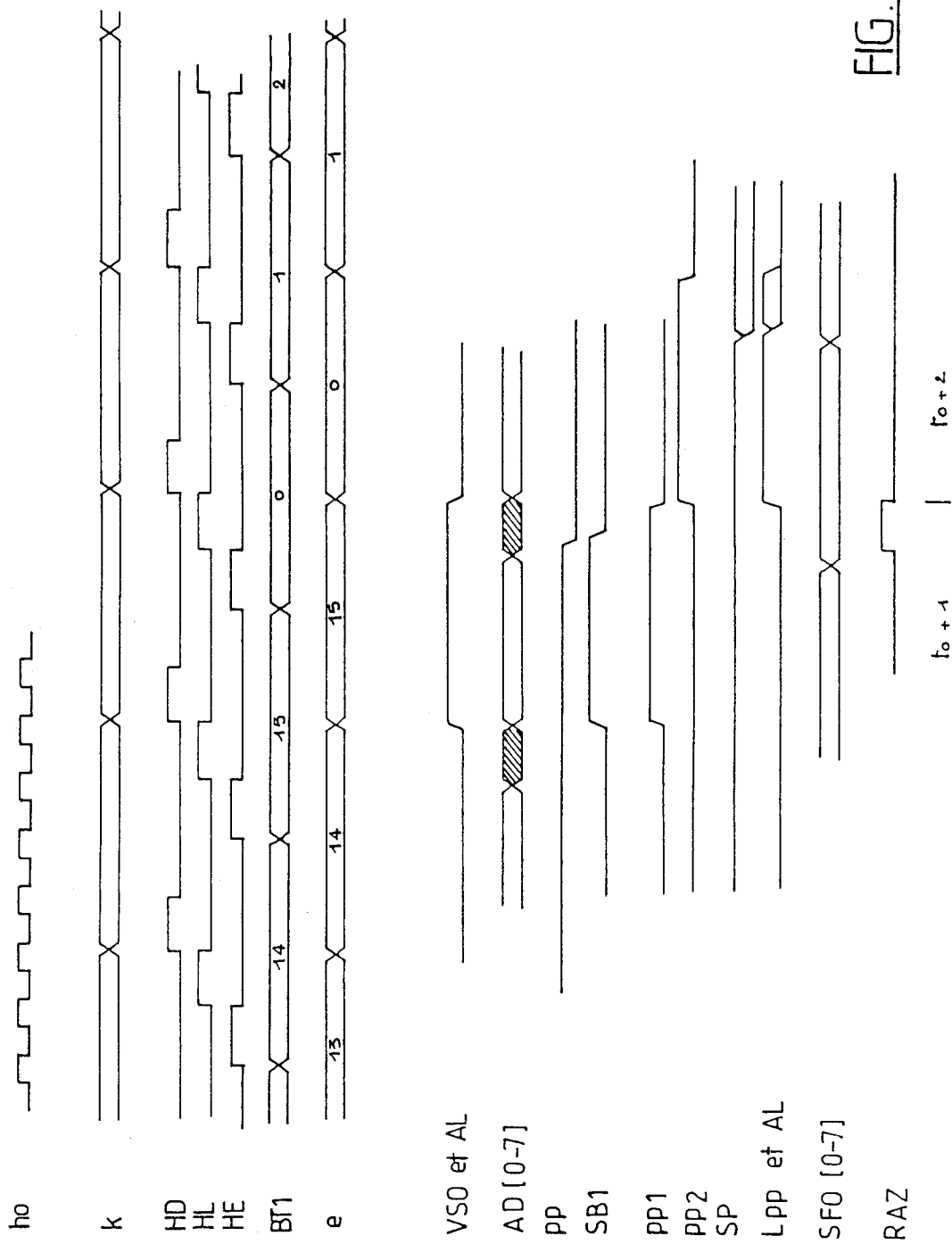

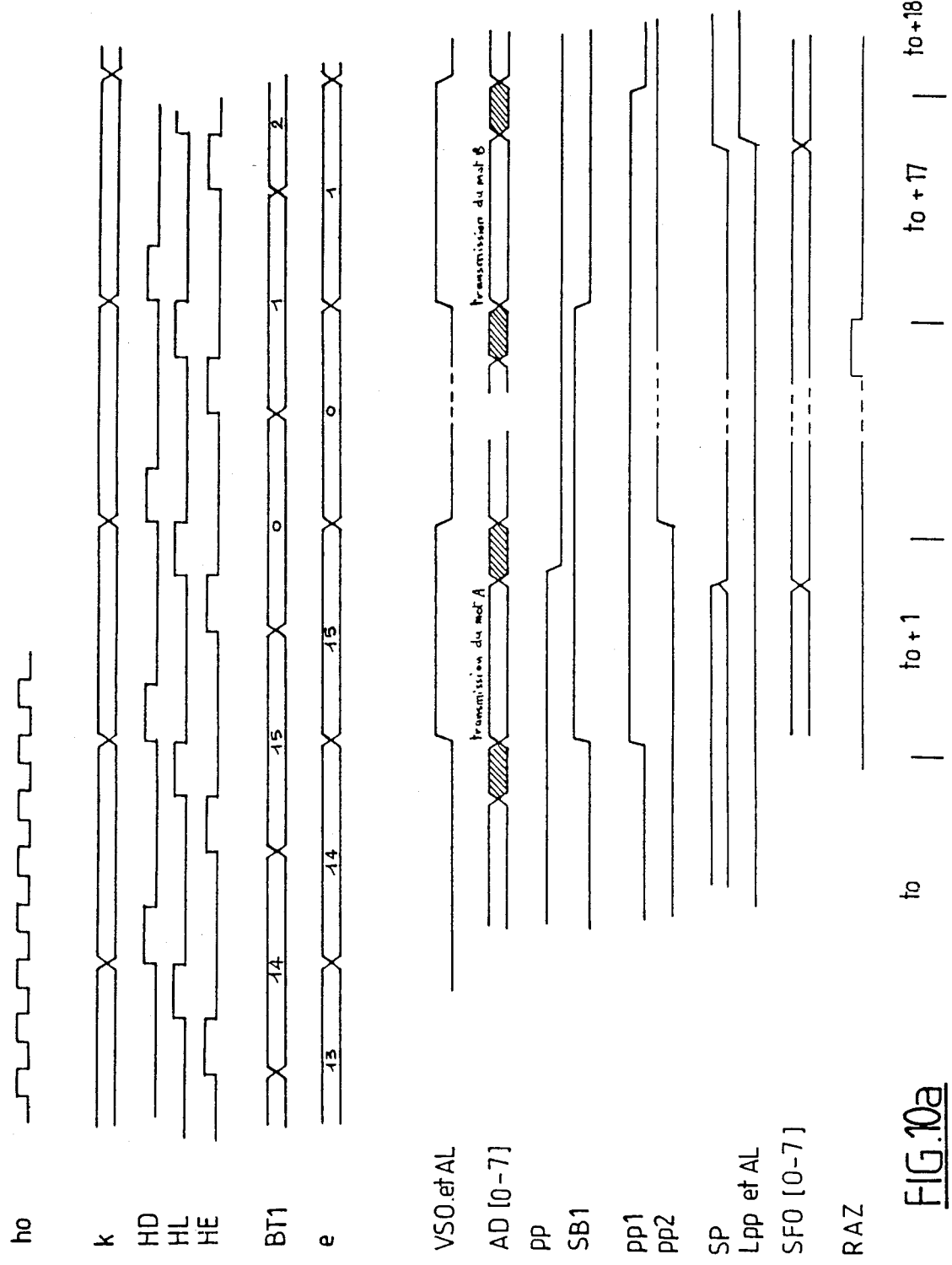

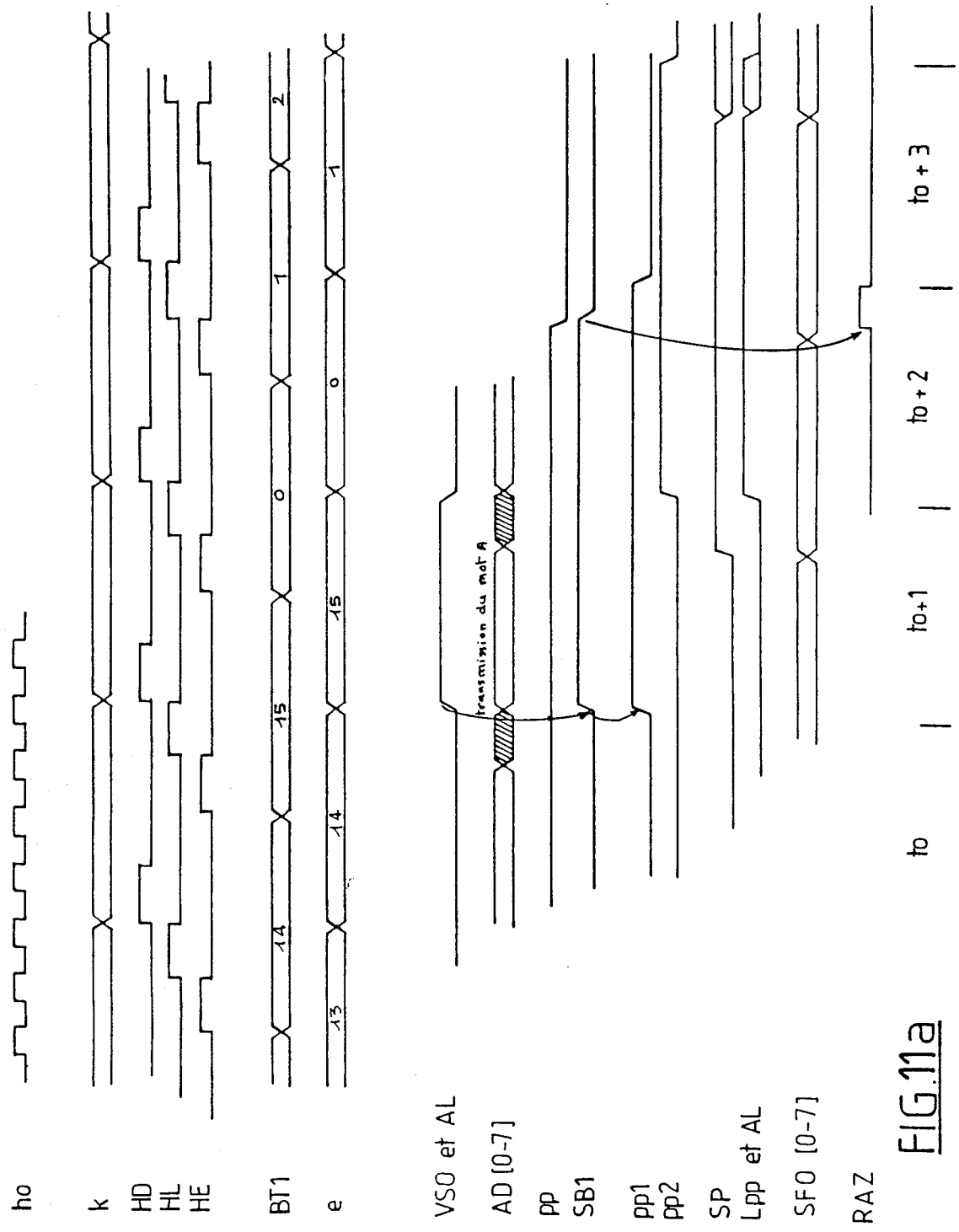

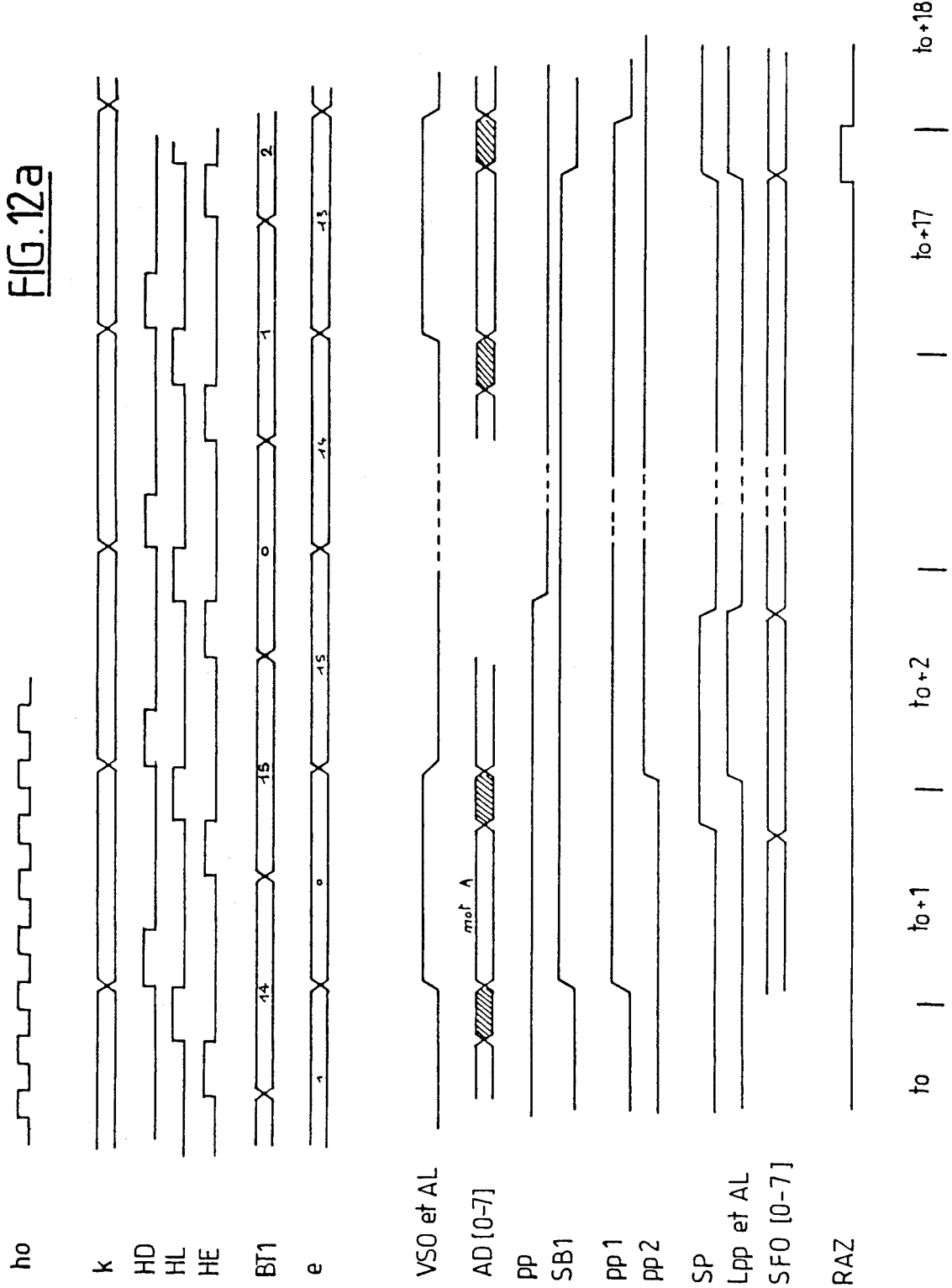

SYSTEM FOR CHANGING PRIORITY OF INFORMATION

The present invention relates to a packet switching system for packets assigned with different semantic and timing priorities between the entering or input time multiplex lines and the exiting or output time multiplex lines.

The term "semantic priority" is used herein to indicate the priority of binary words gathered into a packet form.

In an asynchronous time switching network, the information transmitted, which can be sound, data, digitized pictures or signalling messages, is routed in the form of packets of bits, each packet having a label comprising the definition of the source from which it came and the direction that it should be routed in the network.

The switching system described in document EP-A-O No. 113 639 is particularly well suited to form each switching node in an asynchronous time division switching network. This switching system switches fixed length packets of 128 bits having an 8 bit label, which are carried, for example, on sixteen entering multiplex lines towards sixteen exiting multiplex lines. The document EP-A-O No. 108 028 describes a multiplex structure segmented into equal time intervals where each packet occupies one time interval and where each time interval not carrying an information packet coming from a source is filled by an "empty" packet, that is a packet whose fixed label is reserved for this type of packet and cannot be used for an information packet. The pattern of bits which follow the label of an empty packet is also particular. In practice, the empty packets are used to guarantee synchronization of the multiplex lines.

In the switching system of document EP-A-O No. 113 639, the packet switching function involves associating with each entering packet, identified from others by its entering multiplex number and its label, a new identification itself characterized by two attributes of the same type, that is a new label and a number of the outgoing multiplex line from many which will deliver the packet. In another form, the packet (e,i) is switched, where e is the number of the entering multiplex line and i is the label, and an exiting packet (s,j), where s is the number of the outgoing multiplex line and j the new label.

In the packet switching, a first action is undertaken on the packet (e,i) before its storage in a buffer memory, this action consisting of a "label conversion" which is carried out by a control memory which has been programmed when setting up the link, also called a virtual circuit. Thus, the label i is replaced by the label j. The packet (e,j) is then stored in the buffer memory at a known address, which is a function of the writing instant defined by e. This address is stored in a queueing file associated with the outgoing multiplex line s. The system is controlled by the output and, during each scanning cycle of the outgoing multiplex lines, the queueing file associated with the outgoing multiplex s is read to generate the address of the next packet that the outgoing multiplex s will have to carry.

the buffer memory thus is comprised of a set of N memory zones per entering multiplex and the packets coming from a entering multiplex line e are written in one zone from N assigned to this entering multiplex line, the write address of a packet being incremented modulo-N at each new write operation. In each new set, the write operations are cyclical, that is that the with packet will be destroyed upon writing the (i+N)th packet. A packet can thus not remain in the buffer memory longer than N "packet durations".

The write control of the buffer memory is thus simple, however, in the case where the outgoing multiplex line s is subjected to a traffic burst, that is, the destination of a number of packets greatly exceeding the average, an entering packet may wait longer than N packet durations before being read, such that it is overwritten by an entering packet and it is lost. This occurrence does not always have the same consequences depending whether the communication concerns sound, images or messages. In fact, for example, sound, even of good quality, accepts a greater error rate than that of messages. However, in the transmission of some messages, the loss of a packet can render the message incomprehensible.

We can attempt to avoid, to some extent, this inconvenience by increasing N. Notwithstanding the cost associated volume of additional memory needed, the disturbance of other transmissions, such as the transmission of sound is risked. In fact, to restore a high quality sound, the packet transmission delay in the network must remain lower than a predetermined limit and a packet must not wait longer than a given time in each switch which leads to selecting an N which is to too large.

In the French patent application titled "Systeme de Commutation de Paquets de Donnees a Priorities" and filed July 16th, 1987 by J. P. Quinquis, M. Servel and J. Francois, the first inventor being also a coinventor of the present invention, one of two priority levels is assigned to each packet, to associate the priority information to the packet read address in one or more of the queueing files respectively associated with the outgoing multiplex lines, to process the endings and shifts of these files in terms of their filling, by allowing a greater rate of loss for lower priority level packets, but the write control of the buffer memory is not put in question, and thus, the queueing time in the buffer memory is limited to the scanning time of this memory, that is N "packet durations".

In other respects, the centerpoint of the buffer memory write control is its low efficiency. In fact:

(a) an empty entering packet will occupy nonetheless one zone of the buffer memory, (b) in the buffer memory, a zone is not reusable immediately after the transmission of the packet which it contained, but only N "packet durations" after its last use, and (c) the fact that a set of N memory zones is associated with each entering multiplex leads to an optimal distribution only if the outgoing multiplexes have equivalent loads, but leads to considerable packet losses in cases of temporary local bursts affecting an output multiplex. In fact, evaluations show, that with the write control which makes the write address correspond to the write instant, only a small part of the buffer memory's capacity is used.

One object of the invention is in providing a system which improves the performance of the buffer memory by modifying its write control.

As we shall see below, this control, in accordance with the invention, is combined with write processing of semantic prioritized packets which corresponds to that which is described in the aforenoted patent application filed July 16th, 1987.

Furthermore, this control offers the possibility of processing packets with timing priorities. A packet is said to have a high level timing priority, when it is guaranteed a predetermined maximum buffer waiting time, while the transmission of a low level timing priority packet can be delayed until the outgoing multiplex line for which it is intended has reduced its overload.

Another object of the invention thus is to provide a packet switching system capable of processing in an optimal manner packets having either, at the same time, high level semantic and timing priorities, or packets having a high level semantic priority, or packets having at the same time low level semantic and timing priorities.

In accordance with a feature of the invention, a switching system is provided for information packets assigned with two semantic priority levels between the entering time multiplex line and the exiting time multiplex line, the storing address of a packet in the buffer memory of the switch being stored in each queueing file associated with each outgoing time multiplex line intended to transmit the packet, the system comprising a field point memory of a field of states whose words each are comprised of as many bits as there are outgoing multiplex lines, the addresses of the memory of field points corresponding to that of the buffer memory, each bit of a word being at "1" when the packet stored at the same address as the word and intended for the outgoing time multiplex line corresponding to a bit has a high level semantic priority and has not yet been transmitted by the outgoing multiplex line concerned, each packet storage address being chosen from the field point memory addresses addressing words whose bits are at "0".

In accordance with another feature, the field point memory is write addressed to modify its content by one word, either by writing at the same address in the buffer memory of a high level semantic priority packet, or upon reading at the same address in the buffer memory of a low level semantic priority packet, and write addressed between the write addressings, each word being read in the field point memory triggering, when all the bits are at "0", the selection of their address as the free write address in the buffer memory.

In accordance with another feature, each free address of the field point memory is stored in a free address file whose output generates at the rate of packet arrivals their storage address in the buffer memory.

In accordance with another feature, the free address memory is not read when the entering packet is an empty packet.

In accordance with another feature, the said storage address is stored in each queueing file accompanied by a first bit defining the semantic priority level of the packet, each queueing file comprising in series between the input and the output two zones, writing into the first zone occurring only when the second zone is full, accessible to high level semantic priority packets, and, between two readings of each file, low level semantic priority packets read addresses which had been stored earlier than the read address of the oldest high level semantic priority packet still present in the file, being destroyed in numbers equal, at a maximum to the number of read addresses stored in the first zone.

In accordance with another feature, the storage address is stored in each queueing file accompanied by a first bit defining the semantic priority level of the packet and a second bit defining the time priority level of the packet, each queueing file being comprised of two files, the storing into the first file or the second file being determined by the second bit, the first file storing all the packets with high timing priority level and the second file being read only when the first file is empty.

In accordance with another feature, a bit in the test memory corresponds to each word of the field point memory, the set bit being set at "1" when the corresponding word contains at least one bit at "1", the test memory being read at a rate slightly slower than the average frequency of the stay of the packets in the buffer memory, the reading of a bit "1" in the test memory bringing about the writing of the address of the word corresponding to the field point memory in the address file.

In accordance with another feature, the field point memory has its data input connected to write enable selection wires and for a storage address in the queueing files, the wires are enabled during the second half bit durations of the system, a bit write enable input connected, on one hand, to the output of the output time multiplex scanner, this scanner being enabled during the first multiplex scanner, this scanner being enabled during the first byte duration, through the first AND gates which are individually enabled by the semantic priority bit provided by the label translation memory of the system, that is from the output of the queueing file scan, an address input connected to the output of a first multiplex whose first input is connected to the output of a cyclical binary counter and the second to the output of a second multiplexer whose first input is connected to the data output of the queueing file and the second to the output of the address, the first multiplexer being controlled by the semantic priority bit and the second multiplexer being controlled by the second half byte duration signals, and a second data output connected to the corresponding input of a NAND gate whose output is connected to the write enable input of the address memory whose data input is connected to the cyclical counter and the data output generates these storage addresses.

Figure 2:
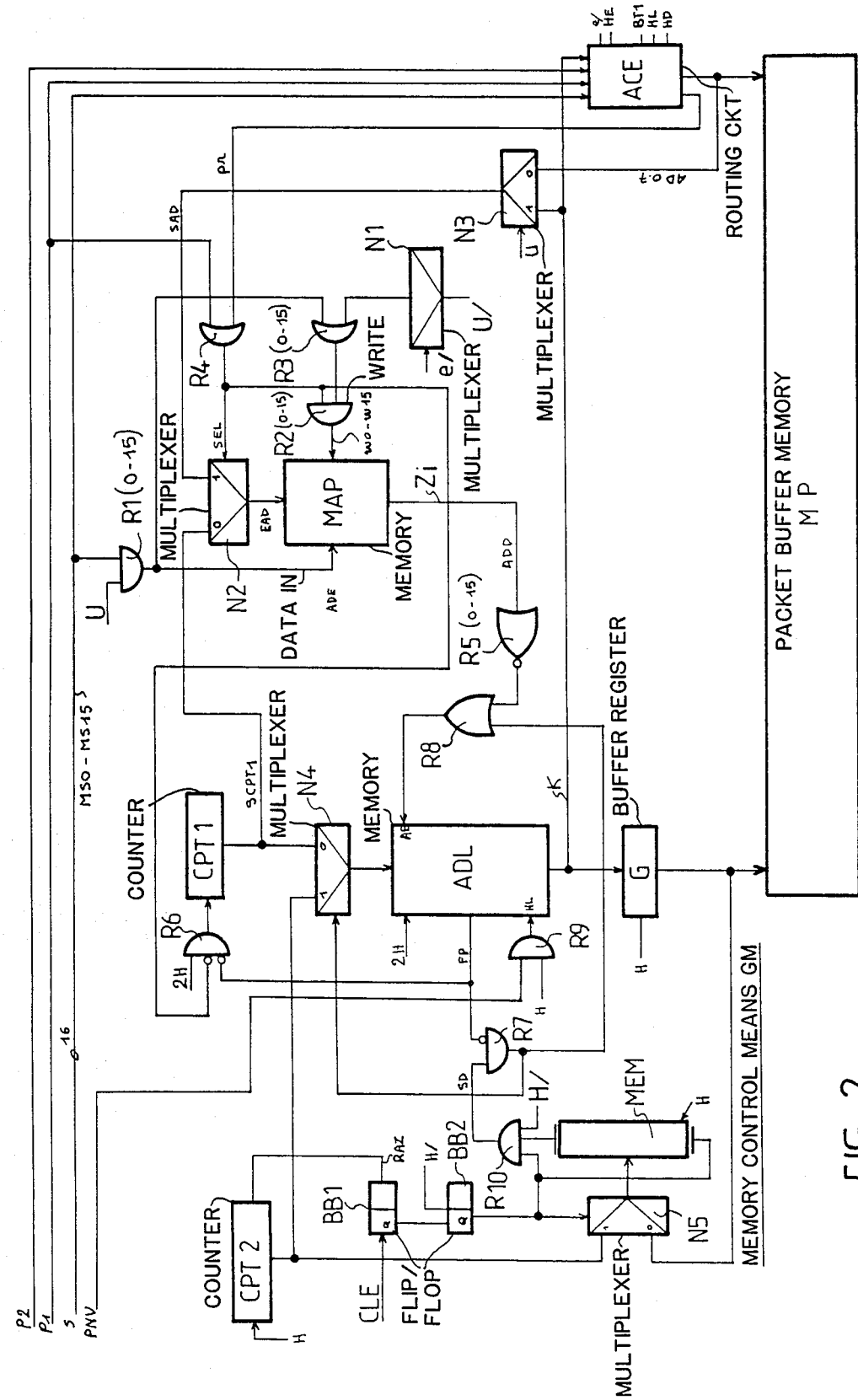
Figure 5:
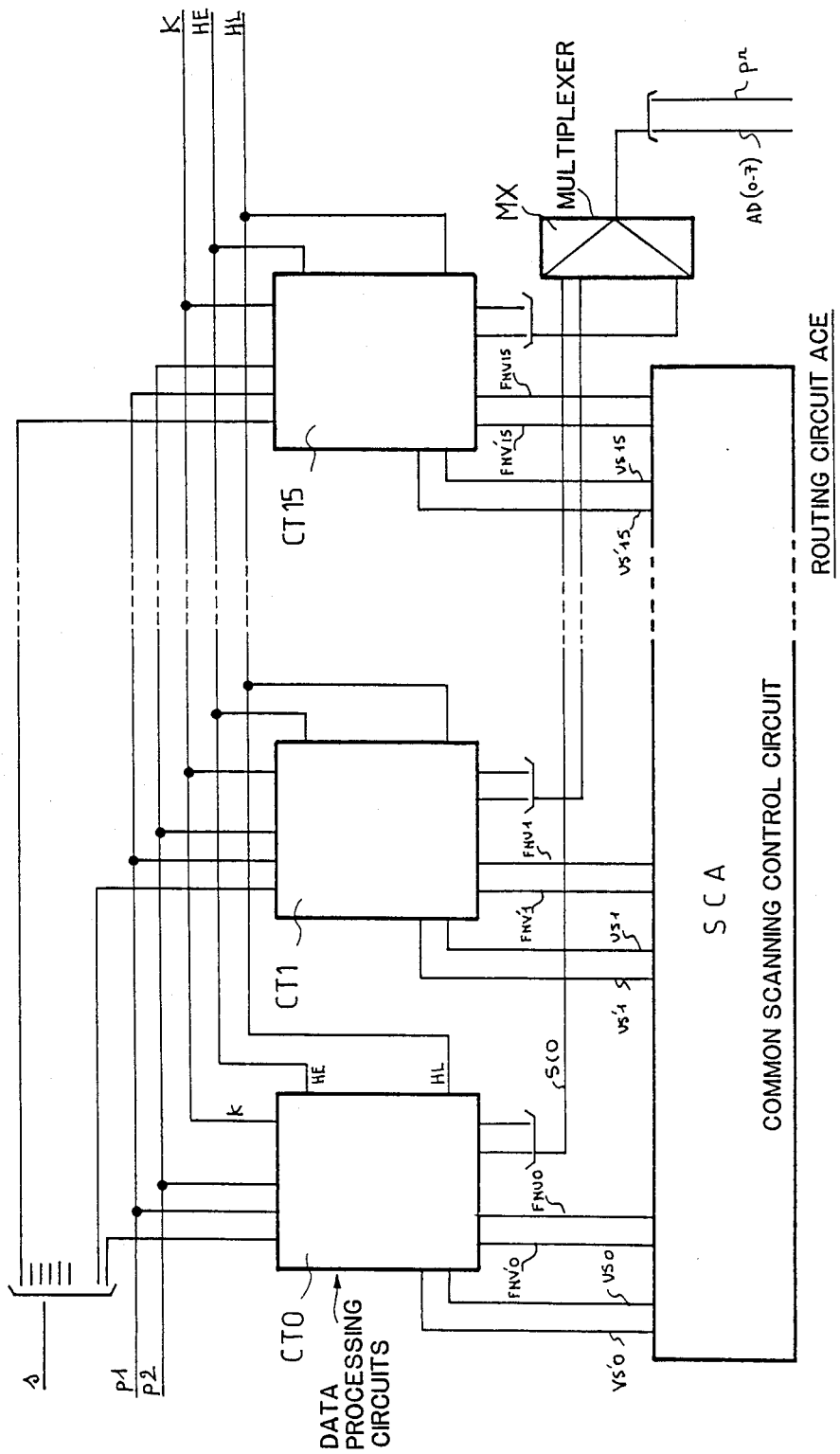
Figure 6:
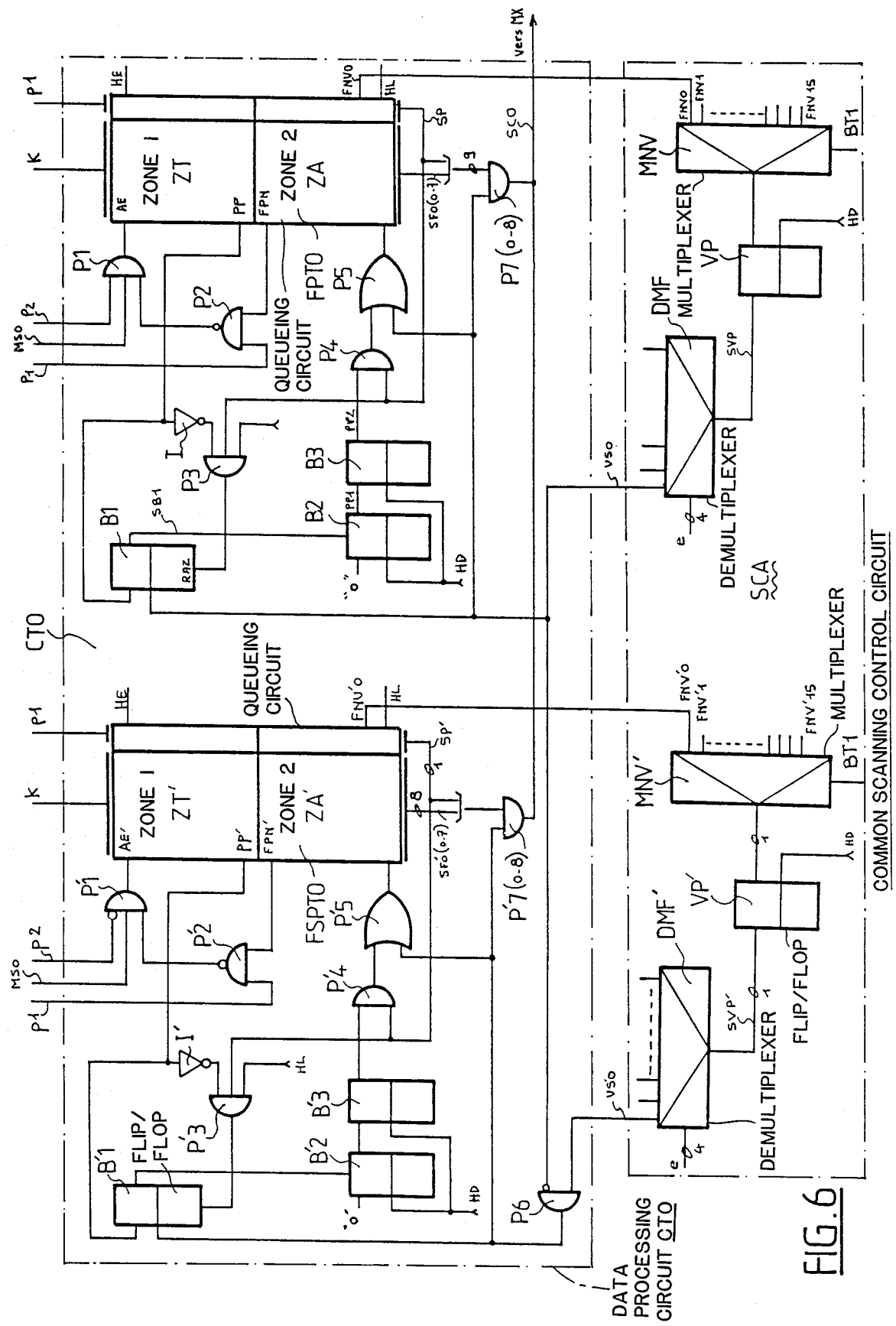

The features of the invention mentioned above, as well as others, will appear clear upon reading the following description of a preferred embodiment, the description being made in relation to the accompanying drawings, in which:

FIG. 1 is a block diagram of a packet switch in accordance with the invention,

FIG. 2 is a schematic of a buffer controlled circuit in accordance with the invention, FIG. 3 shows timing diagrams illustrating the operation of the state memory of the controlled circuit of FIG. 2, FIG. 4 shows timing diagrams illustrating the operation of the securing circuit for the controlled circuit of FIG. 2, FIG. 5 is a block diagram of the switching routing circuit of FIG. 1, FIG. 6 is a schematic of the processing circuit for the routing circuit of FIG. 4, FIGS. 7a to 12a are timing diagrams illustrating various cases of operation of one of the two controlled files of the processing circuit of FIG. 6, and FIGS. 7b to 12b are diagrams which are associated with those of FIGS. 7a to 12a respectively to illustrate how the content of the queueing file concerned varies according to the operation.

The switch of FIG. 1 is the type of switch described in document EP-A-O No. 113 639, but is different by the contents of its routing circuit ACE and the write addressing scheme of the packet buffer memory MP.

The switch has sixteen input ports E0 to E15 and sixteen output ports S0 to S15 which each carry one multiplex line of fixed length packets, such as that which is described in document EP-A-O No. 108 028. One each of the input ports E0 to E15, an input circuit CE is provided which converts each serial byte into a parallel byte and frames it with starts of packets such that from one input port to the next, these starts are generated with a shift of one byte. The outputs of the input circuit CE are connected to the corresponding inputs of a rotation matrix MRE which which carries out a parallel diagonal conversion or again a "paragonal" conversion. After the paragonal conversion, the packet labels are all generated sequentially by the first output of the input rotation matrix MRE while the second output generates the second bytes of the packet, the third bytes, etc. Each label i accompanied by the rank e of the entering port which carried it, is applied to the label translation memory MC which, on one hand, generates a new label j, and, on the other hand, the selection information s of one or more of the queueing files in the routing circuit ACE. Furthermore, as did not exist in the switch of document EP-A-O No. 113 639, the memory MC generates, towards the routing circuit ACE, two bits p1 and p2. The bit p1 is at "0" that the packet has a semantic priority and at "1" it signifies that the packet does not have a semantic priority. The bit p2 at "0" signifies that the packet has a timing priority and at "1" it signifies that the packet does not have timing priority. Thus there are four packet priorities: the packets A, with $p1=p2=1$, which do not have any priority, the packets B with $p1=0$ and $p2=1$, which have the semantic priority, but no timing priority, the packets C with $p1=1$ and $p2=0$, which have timing priority but no semantic priority and the packets D with $p1=p2=0$, which have the two priorities semantic and timing. Finally, the translation memory MP also has an output wire PNV to which it applies the bit "1" when the label which it translates is the label of a non-empty packet and a bit "0" in the opposite case.

The output of memory MC which generates a new label j, on eight wires, is connected to the first input of a buffer memory MP whose other inputs are connected to the corresponding outputs of the matrix MRE. The outputs of the buffer memory MP are connected to the corresponding inputs of the output rotation matrix MRS whose outputs are respectively connected to parallel serial P/S bit converters whose outputs are connected to the outgoing ports S0 to S15 respectively.

The switch of FIG. 1 is comprised also of a central controlled unit UCC which, a function of the established virtual circuits in the network, supplies to the memory MC the translation information of the labels, and a time base BT which supplies, from a local bit clock, the bit clock and the word e. As an example, for a switch consisting of sixteen entering ports the word e is made up of four bits. The word e is generated in the time base BT by a binary counter whose first four outputs generate the word e, the counter being incremented at the clock rate. The word e carried by the link e, FIG. 1, is used to control the input rotation matrix MRE, to identify the entering ports toward the memory MC and to scan the queueing files in the routing files ACE. Its inverse e/, obtained by the inverter INV and carried by the link e/, is used to control the output rotation matrix MRS.

If we consider the sixteen queueing files of the switch described in document EP-A-O No. 113 639, in which are stored the read addresses of the packets and if $2^k$ is the total number of addresses in the buffer memory MP, the capacity of these files could not exceed $2^{k-e}$, because, after a time equal $2^{k-e} \cdot T$, where T is the duration of one port scanning cycle for the outputs S0 to S15, each packet written in the buffer memory MP would be overwritten. We note that T is equal to one packet duration, which is equal to 2e·t0 where t0 is the period of the byte clock.

In accordance with the invention, this inconvenience is avoided by means of no longer, during writing, addressing the buffer memory MP cyclicly, but as a function of the zones of the memory already occupied by packets with semantic priorities. These write addressing means, which constitute control means for the memory are, in FIG. 1, designated by GM.

In FIG. 1, the bundle s, consisting of the wires MS0 to MS15, and the wire p1, coming from the memory MC, are connected in parallel, to the corresponding inputs of the routing circuit ACE and the memory control circuit GM, where the wire p2 is only connected to the routing circuit ACE. The routing circuit generates, on one hand, the read address word AD(0-7) and, on the other hand, a bit pr which indicates if the read address concerns a semantic priority packet or not. The bundle AD(0-7) and the wire pr are connected to the corresponding inputs of circuit GM. The bundle e is connected to the two circuits ACE and GM. The memory control circuit GM generates, on the bundle s, the write address in the memory MP, the word k being also transmitted to the routing circuit ACE.

The schematic of the memory control circuit GM is shown in FIG. 2 and that of the routing circuit ACE in FIG. 6. In FIG. 2 the links with the memory MP and the circuit ACE are also shown. The control circuit GM is comprised essentially of two memories MAP and ADL, and their associated control logic.

The memory map is a memory which reflects the state of occupation of the buffer memory MP by semantic priority packets which have not yet been transmitted. In the buffer memory MP, each zone 1, which constitutes a storage zone of 128 bits of one packet, corresponds to a sixteen bit word Zi whose address i is the same. In the word Zi, each bit corresponds to an outgoing port S0 to S15 and the bit is at "1" if the packet concerned has a high level semantic priority towards the corresponding port and is at "0" only once the outgoing port has transmitted the packet concerned. It appears that the contents of memory MAP can be modified either upon writing the entering packet, or at the reading of an outgoing packet. The memory is, outside of these write operations, scanned cyclicly to generate successively the words Zi. At each time that a word Zi is found with all the bits at "0", its address i is written in the file ADL. Thus we write into the memory ADL, the addresses i which are available for the writing of entering packets into the buffer memory MP. The memory ADL is a file which thus contains, at a given instant, a list of the available addresses in the buffer memory MP. The output of the file ADL generates, at a given instant, the address k in which will be stored the current entering packet. As mentioned earlier, this work k is also transmitted in the queueing files of the routing circuit ACE which are designated by the signals transmitted by the translation memory MC on the bundle s and the wires p1 and p2. The capacity of the write address file ADL can be relatively small as soon as it is full, its output FP, indicating this state, prohibits the scanning of the memory MAP.

The memory MAP has a data input ADE, write enable inputs W0 to W15, and addressing input EAD and a data output Zi. The input ADE has sixteen wires, corresponding to the sixteen bits of a word Zi, which are connected to the sixteen gates R1(0–15) respectively whose first inputs are connected to wires MS0 to MS15 respectively and whose second input receives this signal U. The signal U is at level "0" during the first half of a byte duration and at level "1" during the second. Its inverse U will also be used below.

The inputs W0 to W15 are connected to the outputs of sixteen AND gates (R2(0–15) respectively whose first inputs are connected to the outputs of OR gates R3(0–15) respectively and whose second inputs are connected in parallel to the output of a NOR gate. The first inputs of the OR gates R3 are connected to the outputs of AND gates R1(0–15) respectively and their second inputs are connected to the sixteen outputs of a multiplexer N1 respectively whose data input receives the signal U/ and control input signal e. The inputs of the OR gate R4 are connected to the wire p1 coming from the translation memory MC and to the wire pr coming from the routing circuit ACE.

The addressing input EAD, which has k wires if the capacity of the buffer memory MP is $2^k$, is connected to the output of a multiplexer N2 whose data input SCPT1 is connected to the output of a counter CPT1, whose other data input is connected to the output of another multiplexer N3 and whose control input is connected to the output of OR gate R4. The multiplexer N3 has a data input connected to the k output of the file ADL, another data input connected to the output AD(0–7) of circuit ACE and a control input which receives the signal U.

The sixteen wire data output Zi of the memory MAP, is connected to the sixteen entering inputs of a NOR gate R5 whose output is at level "0" as long as there is a "1" bit in the zone Zi read.

The file ADL has a data input connected to the output of a multiplexer N4, a data output, an input write clock operating at the frequency 2H, a frequency twice that of the byte frequency, the write enable input AE, an output FP indicating when the file is full and a read clock input HL. The first input of the multiplexer is connected to the output of the counter CPT1, the counter CPT1 is a modulo $2^k$ counter. It has its first input connected to the output of a three input AND gate R6 whose first direct input receives the clock 2H, the second inverted input is connected to the output FP of the file ADL and whose third inverted input is connected to the output OR gate R4.

The output FP is also connected to an inverted input of an AND gate R7 whose output is connected, on one hand, to the control input of multiplexer N4 and, on the other hand, to an OR gate R8. The other input of the OR gate R8 is connected to the output of the NOR gate R5 and its output is connected to the write enable input AE of the file ADL. The read clock input HL of the file ADL is connected to the output of an AND gate R9 one input of which receives the clock H and the other of which is connected to the corresponding output of the translation memory MC by the wire PNV, which is at level "1" when the converted label by the memory MC is not that of an empty packet.

The data output K of the file ADL is connected to the corresponding inputs of the routing circuit ACE and the multiplexer N3, as well as to the input of the buffer register G whose clock input receives the clock H and whose output is connected, on one hand, to the addressing input to the buffer memory MP and, on the other hand to the input of a multiplexer N5. The other input of the multiplexer N5 is connected to the output of a counter CPT2 which also connected to the second input of multiplexer N4. The overflow of the counter is connected to the clear input of a flip-flop BB1 whose "1" setting input is connected to a contact CLE periodically activated by a timer, which is not shown. The Q output of a flip-flop BB1 is connected to the data input of a flip-flop BB2 which has its clock input which receives the signal H/ and its Q output connected to the controlled input of multiplexer N5. The Q output of the flip-flop BB2 is also connected to the data input of a memory MEM and to the first input of the three input AND gate R10. The memory MEM is provided with 2k words Y of one bit which correspond to the zones in the buffer memory MP or to the words Zi in the memory MAP respectively. Each word Y has its bit set at "1" when the corresponding zone is not available and at "0" in the opposite case. The memory MEM has its write enable input which receives the signal H; its addressing input is connected to the output of the multiplexer N5 and its data output is connected to the second input of the AND gate R10. The third input of the AND gate R10 receives the signal H/ and its output is connected to the second direct input of AND gate R7.

The operation of the control circuit GM of FIG. 2 will be explained by describing the following basic operations' scanning of the memory MAP, writing of a packet having a high semantic priority level, reading to an outgoing port of a packet with a high semantic, supervising these states of storage.

The scanning of the memory MAP is controlled by the counter CPT1. The gate R6 is assumed passing, which implies that the output of OR gate R4 is at "0" as well as the signal FP, the clock signal 2H increments the counter CPT1 whose output signal SCPT1 is applied to the "0" input of multiplexer N2. At the output signals of an OR gate R4 is at "0", the multiplexer N2 applies the signal SCPT1 to the address input of memory MAP. In other respects none of the gates R2(0–15) are passing because their second inputs are at "0", the address SCPT1 causes the reading of the word Zi stored at that address. If that word Zi contains one or more bits set at "1" the NOR gate R5 does not generate a signal and no writing takes place into the file. In the word Zi contains only "0" bits; this means that the packet stored at address SCPT1 and the buffer memory does not have semantic priority or has been transmitted to all the outgoing ports, the NOR gate R5 applies through the OR gate R8, a signal to the write enable input AE of file ADL which receives the same address SCPT1 coming from the counter CPT1 through the multiplexer N4. In fact as long as the gate R7 is blocked, the output signal from counter CPT1, applied to the "0" input of multiplexer N4, is transmitted by it. We have thus written into the file ADL a packet write address which will be used later.

When the file ADL is full, the signal FP at "1", blocks the gate R6 which no longer transmits the clock 2H and the counter CPT1 stops. The scanning of the memory MAP is thus stopped when the file is full. The counter CPT1 is also stopped when a write operation is occurring in the memory MAP, that is when the output OR gate R4 is at "1".

At each byte time H, the wire PNV being assumed in a state "1", the write address k is read into the memory ADL and transmitted to the write addressing input in the memory MP, through the buffer register G, to the routing circuit ACE and to the "1" input of multiplexer N2, through the multiplexer N3, which is open through the control signal U. If the packet to be written at address k in the buffer memory MP has a high semantic priority, the wire p1 is set at "1" which opens the OR gate R4 which transmit the address signal k to the input address of memory MAP. In other respects, during the same time, the AND gates R1(0–15) transmit the word ADE coming from the memory MC and designating the outgoing ports concerned towards the data input of the memory MAP. Finally, the same word ADE is transmitted to OR gate R3(0–15) which transmits it to the corresponding inputs of AND gates R2(0–15) which are opened by the output of gate R4. Thus the write enable inputs w0 to w15 which correspond to the outgoing ports S0 to S15 designated to transmit the packet concerned are marked. The word ADE is thus written in the memory MAP, where it becomes the word Zi.

If the packet to be written does not have a high level semantic priority, none of the inputs w1 to w15 is enabled, such that at the address k in the memory MAP, the word Zi remains with all its bits set at "0".

When the output port, identified by the signal e/, transmits a packet with a high level semantic priority, the output wire pr from the routing circuit ACE opens the OR gate R4, the multiplexer N3 connects, during the signal U, the output AD(0–7) of circuit ACE at the "1" input of multiplexer N2 which thus transmits the read address AD(0–7) of the packet to the address input of the memory MAP and the multiplexer N1 controlled by the signal e transmits the signal U/ to the gate R3(0–15) which corresponds to the outgoing port concerned. In other respect, all the gates R1(0–15) are closed during the signal U/, the data input of the memory MAP thus transmits a word where all the bits are set to "0". However only the "0", which corresponds to the write enable input w0 to w15 designated by the open gate R3, will be written. In the word Zi, there is thus a transition from "1" to "0" for the bit corresponding to the outgoing port on which it has been transmitted the packet with the semantic priority.

When the packet to be transmitted does not have a high level semantic priority, the gate R4 is closed, none of the gates R2(0–15) is opened and no change results on the corresponding word Zi. This observation is of special interest when we choose to modulate the semantic priorities for the packets broadcast. It is then necessary to have as many wires p1 as wires s and as many gates R4. A person skilled in the art can thus make minor modifications to the schematic of FIG. 2.

The timing diagrams of FIG. 3 demonstrate the signal e which identifies the byte durations, the signal k, the signal AD(0–15), all three synchronous, the signal U which is at "0" during the first half byte duration and at "1" during the other half byte duration, the signal p1, the signal pr, the output signal SEL from OR gate R4, the output SED from multiplexer N3, the signals MS(0–15) generated by the memory MC, the output signal ADE(0–15) of gates R1(0–15) and the signals w(0–15) generated by the gates R2(0–15) respectively.

As an example, we shall assume that a packet with a high level semantic priority is to be broadcast to the outgoing ports S0, S5 and S9, should be loaded into the buffer memory at the write address "24", and that, during the byte duration, a packet with high level semantic priority, which had been written in the buffer at address "4" should be transmitted on the outgoing port S7.

The byte generated, defined by e, thus has the value 7, the signal AD(0–7) the value 4 and the signal K the value 24. The signal p1 is at "1" during the whole number 7 byte duration and it is the same for the signal pr. The gate R4 thus generates the signal SEL at "1" during the same byte duration. The multiplexer N3 controlled by the signal U generates the first half time duration, the value 4 of AD(0–7) and during the other half time duration the value 24 of K, which is indicated by the signal SAD. During the entire byte duration, in the bundle s, only the signals MS0, MS5 and MS9 are at "1". All the signals ADE(0–15) are at "0" during the first half duration (U=0) and only the wires ADE0, ADE5 and ADE0 are at "1" during the other half duration (U=1). During the first half duration, the demultiplexer N1 generates a "1" towards gate R3(7) and "0" towards two other gates. Thus at gate R3(7) generates a "1" during the first half duration. This is what w7 shows and since at the same time the wire ADE4 is at "0", the bit no. 7 of word no. 4 goes to "0". During the second half duration, the gates P2(0), R2(5) and R2(9) generate "1", the wires ADE0, ADE5 and ADE9 are at "1" and the address generated by the signal SAD has the value 24. Thus the bits 0, 5 and 9 of word Zi of address 24 go to "1", the other bits of this word remaining at "0".

As we have assumed above in relation to the scanning of the memory MAP, one zone of the buffer memory MP occupied by a packet with semantic priority can only be reused if the word Zi which corresponds to it in memory MEP has all its bits at "0". Thus an overflow in the queueing file or improper operation of a component such as one of the gates R2(0–15), can prevent the resetting to 0 of one or more of the bits of a word Zi. In all probability, this type of event has a cumulative effect.

In accordance with the invention, we have used the memory MEM and the counter CPT2 to artificially free a zone considered to be definitely blocked.

Aside from the verification cycle, the Q output of flip-flop BB2 and thus the data input of memory MEM are at "0". In this stage, at each time that a write address k is read into the file ADL, this address is transmitted by the multiplexer N5 to the addressing input of memory MEM whose corresponding bit is set at "0". In other respects, the output of gate R10 is at "0".

When the CLE input is enabled, the output signal Q of flip-flop BB1 is recopied, at time H/, by the flip-flop BB2 which generates a level "1" signal. The multiplexer N5 changes the state and transmits the output signals from counter CPT2 towards the input address of memory MEM. At each time H/, the gate A78 recopies the bit scan in the memory MEM. If this bit is at "1", the zone associated has not been freed and is considered to be blocked. The gate R10 whose output is at level "1", changes the state of multiplexer N4, through gate R7, the file ADL being assumed not full. The multiplexer N4 transmits to the data input of file ADL the count obtained by the counter CPT2, that is the address of the zone considered to be blocked, which will then be generated by the file ADL for writing of a new packet.

Thus the memory MEM and the counter CPT2, with their associated circuits, allow the unblocking of an address. It may be seen that the bit corresponding to the memory MEM is immediately reset to "1" by the output of the flip-flop BB2. When the counter CPT2 overflows, it resets the flip-flop. BB1 to "0" and the system is out of verification cycle.

The timing diagrams of FIG. 4 illustrate the signal which comes either from the output of buffer register G, or from the output of counter CPT2, and which can take on a value of 0 to 255; the byte clock signal H; the frequency signal 2H; and the signal coming from the output Q of flip-flop BB2 respectively.

The routing circuit ACE of FIG. 5 has sixteen identical processing circuits CT0 to CT15, a scanning circuit SA and a multiplexer MX. The circuits CT0 to CT15 each contain two queueing file and logic circuits. Thus the circuit CT0 contains the two files FSPT0 to FPT0, the circuit CT1 contains the file FSPT1 and FPT1, . . . and the circuit CT15 contains the files FSPT15 and FPT15.

In FIG. 6, we showed the circuit CT0 and the circuit SCA, which is common to the sixteen processing circuits. The queueing file FPT0 has a data input which receives the word K from the file ADL, and the signal p1 from the label translation memory, a data output which generates the read address SF0 and a signal sp, a write clock input HE, a read clock input HL, a write enable input AE, a shift enable input AL and an output FNV0 indicating that the file is not empty. The signal sp corresponds to the signal p1 associated with address FS0 which is present at the data output of file FPT0. Furthermore, the file FPT0 is divided into two zones ZT and ZA arranged in series between the data input and the data output, and it is provided with an output FPN indicating that the zone ZA is full and an output pp indicating that the zone ZT contains at least one word.

The queueing file FSPT0 has a data input which receives the word k from file ADL, and the signal p1 from the label translation memory MC, a data output which generates the read address SFO' and a signal SP', a write clock input HE, a read clock input HL, a write enable input AE', a shift enable input AL' and an output FN0' indicating that the file is not empty. The signal SP' corresponds to the signal pl associated with the address SF0' which is present at the data output FPT0. Furthermore the file FSPT0 is divided into two zones ZT' and ZA', arranged in series between the data input and the data output, that it is provided with an output FPN' indicating the zone ZA' is full and an output PP' indicating that the zone ZT' contains at least one word. The bundle s consists of sixteen wires MS0 to SM15 which are associated with the circuits CT0 to CT15 respectively. The wire transmitting the signal p1 is duplicated on the corresponding circuits CT0 to CT15. The data outputs S0 to S15 of circuits CT0 to CT15 are connected to the sixteen inputs of multiplexer MX respectively whose output generates the read addresses of the buffer memory MP, and the signal pr. The outputs FNV0 and FNV'0 are connected to the corresponding inputs of the scanning circuits SCA respectively.

In the circuit SCA, the inputs FNV0 to FNV15 are connected to the sixteen inputs of a multiplexer MNV respectively whose output is connected to the data input of a flip-flop VP0 whose clock input receives the signal HD. The Q output of the flip-flop VP generates the signal SVP and is connected to the input of a demultiplexer DMF whose sixteen outputs generate the signal VS0 to VS15 to the circuits CT0 to CT15 respectively. The controlled inputs of the demultiplexer DMF and multiplexer MNV receive the signals e and BT1.

In the circuit SCA, the inputs FNV'0 to FNV'15 are connected to the sixteen inputs of multiplexer MNV' respectively whose output is connected to the input of flip-flop VP' whose clock input receives a signal HD. The Q output of the flip-flop VP' generates the signal SVP' and is connected to the input of a demultiplexer DMF' whose sixteen outputs generate the signal VS'0 to VS'15 to the circuits CT0 to CT15 respectively. The controlled inputs of demultiplexer DMF' and of multiplexer MNV' receive the signal e and BT1.

The input AE of file FPT0 is connected to the output of a three input AND gate P1 whose first input is connected to wire P2, the second to wire MS0 and the third to the output of NAND gate P2. An inverting input of gate P2 is connected to wire p1 and the other to the output FPN of the file. The output PP of the file is connected, on one hand, to the signal input of flip-flop B1 and, on the other hand, to the input of an inverter i whose input is connected to the first input of a three input AND gate P3 whose second input is connected to the output SP of the file and whose third input receives the signal HL. The output of the gate P3 is connected to the CLR input of flip-flop B1 whose clock input is connected to the VS0 of demultiplexer DMF. The Q output of the flip-flop B1, which transmits the signal SV1, is connected to the "1" setting input of a flip-flop B2 whose signal input is at "0" and whose clock input receives the signal HD. The Q output of flip-flop B2, which transmits the signal PP1, is connected to the signal input of flip-flop B3 whose clock input receives the signal HD. The Q output of flip-flop B3, which transmits the signal PP2, is connected to one input of an AND gate p4 whOse second input receives the signal SP. The output of gate P4 is connected to one input of an OR gate P5 whose other input is connected to the output VS0 of demultiplexer DMF and whose output is connected to the shift enable input AL.

The input AE' of the file FSPT0 is connected to the output of a three input AND gate P'1, one input of which is inverting and two being non-inverting, whose inverting input is connected to wire P2, the first non-inverting input of wire MS0 and the second non-inverting input to the output of a NAND gate P'2. An inverting input of the gate P'2 is connected to wire p1 and the other to the output FPN' of the file. The output PP' of the file is connected, on one hand, to the signal input of a flip-flop B'1 and, on the other hand, to the input of an inverter i' whose output is connected to the first input of a three input AND gate P'3 whose second input is connected to the output SP' of the file and whose third input receives the signal HL. The output gate P'3 is connected to the CLR input of flip-flop B'1 whose clock input is connected to the output of an AND gate P6. The gate P6 has a direct input which is connected to the output VS'0 of demultiplexer DMF' and at an inverting input which is connected to the output of multiplexer DMF. The Q output of flip-flop B'1 is connected to the "1" setting input of flip-flop B'2 whose signal input is at "0" and whose clock receives the signal HD. The output Q of flip-flop B'2 is connected to the signal input of a flip-flop B'3 whose clock input receives the signal HD. The Q output of flip-flop B'3 is connected to one input of an AND gate P'4 whose second input receives the signal SP'. The output of gate P'4 is connected to one input of an OR gate P'5 whose other input is connected to the output of gate P6 and whose output is connected to shift enable input AL'.

The eight output wires of the file FPT0, as well as the output wire SP, are connected to the first inputs of AND gates P7(0-9) whose second inputs are connected to the output VS0 of demultiplexer DMF. The eight output wires of the file FSPT0, as well as the output wire SP', are connected to the first inputs of AND gates P'7(0-9) whose second inputs are connected to the output of the AND gate P6. The outputs of gates P7(0-9) and of gates P'7(0-9) are respectively connected in parallel to the inputs of demultiplexer MX respectively, eight outputs of which carried the read address AD(-0-8) and the ninth the signal pr.

The timing diagrams of signals HE, HL, HD, k, BT1 and e are shown in FIG. 7a, as well as in FIGS. 8a and 12a. The signal h0 has a period that is close that of a bit clock of the switch. The signal e, available on four wires, is incremented at each byte duration, that is every four periods of h0. The signal k is supplied by the file ADL which is read at the byte clock rate H, the signal k thus changes value in synchronism with the incrementing of the signal e. By its value, the word k defines a write address varying, in a quasi-random manner, from 0 to 255. This signal HD is at a high level during the first bit duration of a byte duration at the low level during the six following bit durations. The signal HL is ahead by two bit durations with respect to signal HD and the signal HE is in advance by two bit durations with respect to the signal HL. The signal BT1, available on four wires, is incremented at each byte duration, but is ahead by one half duration with respect to the signal e.

The signals MS(0-15), which are generated by the memory MC, each last one bit duration. When for example, the signal MS0, is at "1", there is a request to write into one of the files of circuit CT0 and when it is at "0", there is no request towards the files of this circuit. More particularly, the writing when it is requested, is carried out on the leading edge of the signal HE.

As shown in FIG. 6, the writing of a packet read address is only possible into the file FPT0 or into the file FSPT0 depending on the value of the bit p2 which defines the timing priority level when P2 is at "1" the address k can only be written into the file FPT0 because only the AND gate P1 can set the input AE to the high level. When p2 is at "0" the address k can only enter into the file FSPT0 whose write enable can be received by AND gate P1'. Thus, the file FPT0 contains only addresses of high level timing priority packets and some of these packets can also have a high level semantic priority. The file FSPT0 will only contain the addresses of packets without timing priority, but some of these packets could have a high semantic priority level.

In other respect, the writing into the file FPT0 (with P2=1) is enabled when the signal FPN is at "0", because the output of the NAND gate P2 is at "1", whatever the state of signal p1, that is the packet concerned has a high level of semantic priority or not. The transition level "1" of wire MS0 thus opens the gate P1 and the signal of AE enables writing of the word k into the file, which is carried out by the signal HE whose leading edge appears in the middle of a duration.

When the signal FPN is at "1", indicating that the zone ZA of file FPT0 is full, the output of gate P2 can only be at "1" when the wire p1 is at "1". Thus there can only be a write authorization (AE=1) if the packet concerned has a high level (p=1) semantic priority. Each word k corresponding to such a prioritized packet present and intended for the output S0 is written and shifted in the file FPT0 but can be found in the zone ZT. The corresponding words k to these low level semantic prioritized packets are not in this case written in the file FPT0 although they have a high level semantic priority. The contents of these packets in the memory MP will be lost.

With regards to file FSPT0, the same applies, that is, when the zone ZA' is full, the signal FPN' only allows, through AND gate P2', the writing of high level semantic priority packets.

The signal e is a four bit word whose value varies cyclicaly from 0 (0000) to 15 (1111) at the bit rate to scan the files SC15 to SC0 respectively in order to transmit the read address to the buffer memory MP through the multiplexer MX. This signal BT1 is also a four bit word which takes on the same values as the signal e, but with a shift forward of one half byte duration. We shall see below how the signal BT1 is used.

Before examining a number of cases of significance of the files FPT0 and FSPT0, the operation of the scanning circuit SCA in FIG. 6 shall be described. It is first assumed that none of the files FPT0 and FSPT0 is empty. In this case the two outputs FNV0 and FNV'0 are at "1". At the time the signal BT1 takes on the value 0000, the signals FNV0 and FNV'0 are transmitted to flip-flops VP and VP' respectively, through the multiplexers MNV and MNV' respectively. The flip-flops VP and VP' recopy these signals, in one case at "1", on the leading edge of signal HD. The diagram of the signal SVP and SVP' is shown in FIG. 7a. When e=0000, the signal SVP and SVP' are generated by the demultiplexers DMF and DMF' respectively, at their outputs VS0 and VS'0 respectively. The signal VS0, at "1" inhibits the gate P6 when it is transmitted to the OR gate P5 and to the AND gate P7. On one hand, the signal applied to the shift enable input AL goes to "1" and, on the other hand, the AND gates P7 applies the address word AD(0-7) and the bit SP to multiplexer MX which transmits these because the signal e applied to its control input A also has the value 0000. As shown in the diagram "VS0 and AL" of FIG. 7a, the signal AL remains at "1" for one byte duration e=0000 and, on the leading edge of HD included during this time, a shift is carried out in the file and the word presented at the output of file FPT0 is replaced by the next.

In other respects the gate P6, which is inhibited has not allowed the transition to a level "1" of the input AL' of file FSPT0. Thus the word present at the output of this has not been transmitted by the multiplexer MX and there has been no shift in the file FSPT0.

Now supposing that the file FPT0 is empty while the file FSPT0 is not empty. The signal FNV0 is at "0" and the signal FNV0' is at "1". The operation of the demultiplexers DMF and DMF', the flip-flops VP and VP' and the demultiplexers DMF and DMF' show that at time 0000, the signal VS0 is at "0" and the signal VS'0 is at "1". Thus the input AL remains at "0", the gates P7(0-8) are inhibited while the gate P6 is open allowing the setting to "1" of the input AL' and the opening of gates P'7(0-8). The multiplexer MX transmits the word present at the output of file FSPT0 which is subjected to a shift on a leading edge of HD.

In conclusion the addresses present in the file FPT0 are timing prioritized with respect to those which are in the file FSPT0, which is only read through the multiplexer MX when the file FPT0 is empty.

We note that the signals SP and SP' are transmitted through the multiplexer MX to give the signal pr which is used for the write operations in the state memory MAP as we have described in relation with the FIG. 2.

Below, we will examine six cases of significant filling of the file FPT0 in order to illustrate the processing of high level semantic prioritized packets and also of low level semantic prioritized packets in this file. As an example, we will assume that the capacity of the active zone ZA of the file is sixteen words, although this is not necessary, the capacity of the transit zone ZT being for example eight words. The filling of the file SPT0 depending on these six significant cases will be processed, according to the invention, in the same manner and the description detailing the processing and could also be used with respect to the file FPT0.

Figures 7B, 8B, 9B, 10B, 11B, 12B:
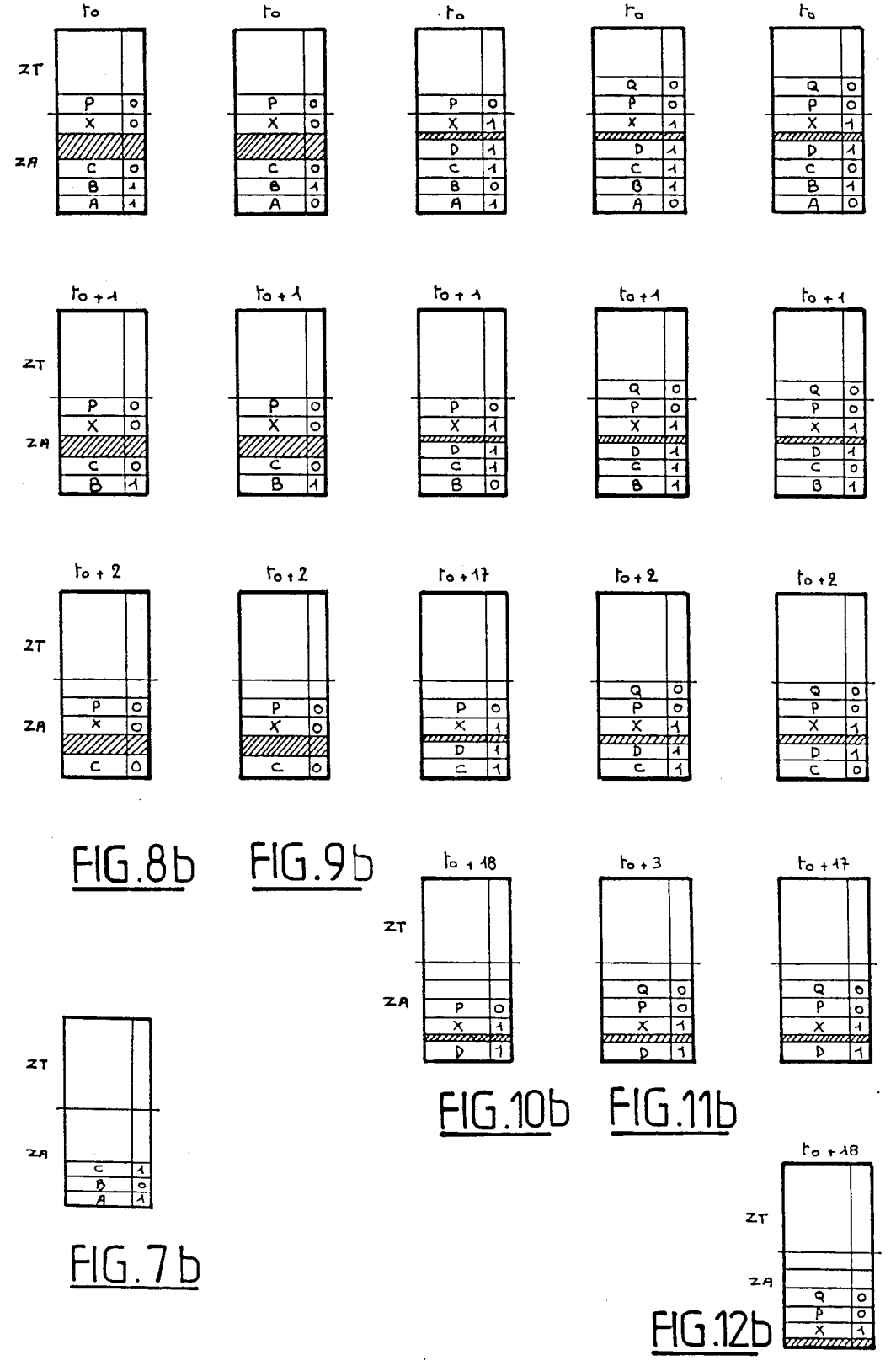

As shown in FIG. 7b, which concerns the first case of operation, we assume that in the file FPT0, three words A, B* and C have been successively written, the sign * indicating that they weren't considered as a high semantic priority level. The signal FPN is thus in this, case at "0" and the signal FNV0 is at "1". As in all the files, the word A and the bit SP are available at the output of file, which means that it is present at the corresponding inputs of gates P7(0-8) which will be open at time e=1111. At the same byte time, the contents of word A is transmitted, by the multiplexer MX, on the output AD(0-7) of multiplexer MX towards the address input of the read memory MP. Described above is how the signal FNV0 would allow the setting of input AL at "1" and how the leading edge HL, in the byte time e=1111, would cause a shift in the file to replace the word A by the word B8, while the word C takes the second place. Thus, in this case the operation the word A has been written through the multiplexer MX, then has been removed from the file FPT0 by a shift operation. The timing diagram AD(0-7) of FIG. 7a illustrates that at the byte time e=0000, the multiplexer MX transmits the word read in one of the files of circuit CT15.

In FIG. 8b which illustrates with FIG. 8a a second case of operation, three successive states of the file FPT0 are shown, at byte times to (e=1110), t0+1 (e=1111) and t0+2 (e=0000). At time t0, the waiting zone ZA is full and contains the words A, B*, C, etc., X*, and the transmit zone ZT contains the word B*, which obviously has high semantic priority level. Among the timing diagrams of FIG. 8a, the successive times t0 t0+1 and t0+2 is also shown. At the transition from time t0 to t0+1, as in the previous case illustrated in FIGS. 7a and 7b, the word A is read through the multiplexer MX, then, towards the end of time t0+1, it is removed from the file and replaced by the word B. This is the state t0+1 of FIG. 8b.

In fact, at times t0, the signal PP is at "1" as well as the signal FNV0. When e takes on the value 1111, the flipflop 1 receives the signal VS0 from the multiplexer DMF and recopies the signal PP to "1", which results in setting the flip-flop B2 also at "1" through SB1. At time t0+1 on the leading edge of HL, that is at the time the word A is removed from the file, the flip-flop B3 recopies the state PP1 from the flip-flop B2 and causes the state PP2 to go to "1". At time t0+2 the word B, which has taken the place of A, not being prioritized, the signal SP is at "1" such that the gate P4. With its two input "1", maintains through OR gate P5, the signal AL at protocol 1. Thus at the next leading edge of signal HL, that is towards the end of time t0+2, the word B is removed through shifting of the file FPT0. At the end of time t0+2, as shown in FIG. 8b, the contents of the file is thus C*, etc., X*, P*.

It should be noted that the word B has not passed through the multiplexer MX, because at time t0+1, the signal e had the value 1111 and the multiplexer MX, through the gates P7(0-7) or P'7(0-7), connected the output of the file FPT15 or FSPT15 to its output AD(-0-7). The packet which was stored at the address B in the buffer memory MP will thus not be transmitted to the outgoing port S0, if this packet is intended uniquely for port S0, it is lost but if it was a packet intended to be broadcast to a number of other ports than S0, it remains available in the queueing file associated with these ports.

In other respects, as soon as the word A has been removed from the file FPT0, the word P* goes from the transit zone ZT to the queueing zone ZA such that the signal PP goes to "0". The output of inverter I is thus at "1", as is the signal SP, since the word B does not have a high semantic priority level, such as at the next leading edge of HL, the CLR output of gate P2 resets the flip-flop B1 to "0". At the next leading edge of HD, the flip-flop B2 whose data input is at "0" recopies this state which is also recopied by the flip-flop B3 at the next leading edge of HD, that is at the end of time t0+1. Thus, at the beginning of time t0+2, the zone ZT is empty and the set of flip-flops B1 to B3 is at the rest state, the circuit CT0 can thus continue to operate as in the first case illustrated by FIG. 7a and 7b.

At time t0+17, which is not shown, the word C* will normally be read through the multiplexer MX and removed from the file FPT0.

Figure 9A:
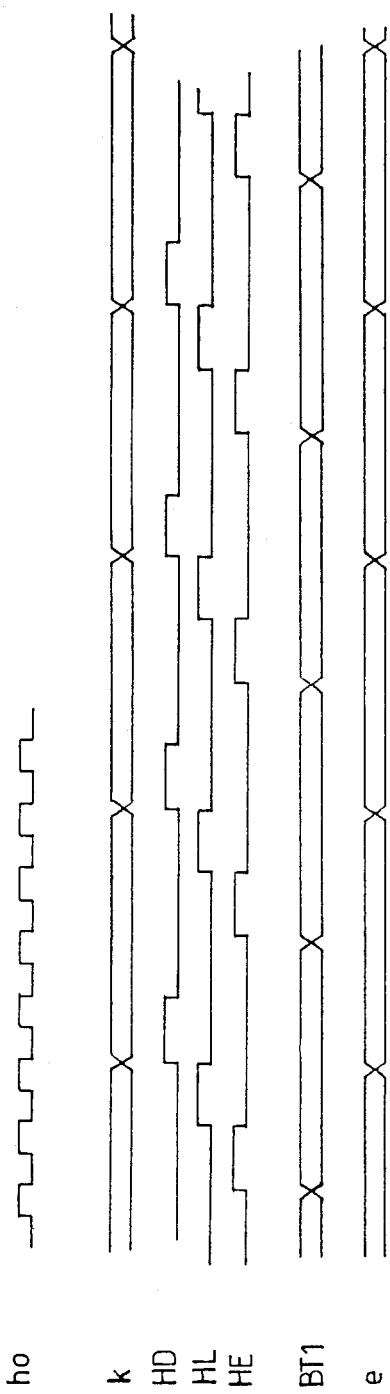
Figure 9A:
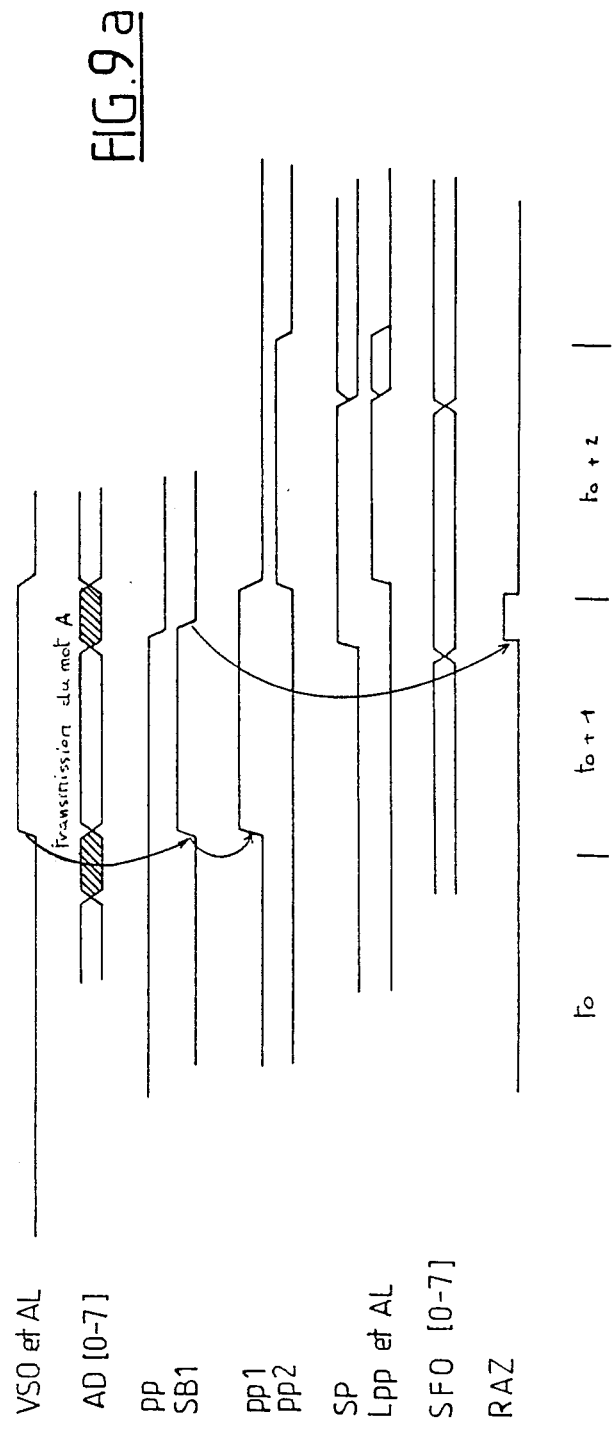

In FIG. 9b which illustrates with FIG. 9a a third case of operation, three successive states of file FPT0 are shown, at byte time t0 (e=1110), t0+1 (e=1111) and t0+2 (e=0000). At times t0, the waiting zone ZA is full and contains the words A*, B, C*, etc., X*, and the transit zone ZT contains one word P*. In the timing diagram of FIG. 10a, we have also shown the succession of these times. At the transition from time t0 to time t0+1, the word A* is normally read through the multiplexer MX, then, towards the end of time t0+1, it is removed from the file and replaced by the word B. This is state t0+1 of FIG. 9.

In fact, at time t0, the signal PP is at "1" as well as the signal FNV0. When e takes on the value 1111, the flip-flop B1 receives the signal VS0 from the demultiplexer DMF and recopies the signal PP to "1", which results in setting the flip-flop B2 also to "1" through SB1. At time t0+1 on the leading edge HL, that is at the time where the word A* is removed from the file, the flip-flop B3 recopies the state PP1 from the flip-flop B2 and causes the state PP2 to go to "1". At time t0+1 the word B, which has taken the place of A*, not being prioritized, the signal SP goes to "1", such that the gate P4, with its two inputs at "1", maintains AL at "1", through the gate P5. Thus at the next leading edge HL, that is towards the end of time t0+2, the word B is removed through shift of the file FPT0, but it has not been transmitted by the multiplexer MX. .And the end of time t0+2, the contents of the file is thus C*, etc., X*, P*. At time t0+17 which is not shown, the word C* will normally be read through the multiplexer MX and removed from the file.

The resetting to the initial state of flip-flops B1 to B3 is carried out as described in the second case above.

The third case of operation is thus practically the same as the second, but is useful to describe it to better understand that whatever the state of a file FPTi or FSPTi at the time where the signal e takes on the value i, the word which is present at its output, whether it be semantically prioritized or not, is read through the multiplexer MX and used to cause transmission from a packet from the buffer memory MP towards the outgoing port Si.

In FIG. 10b, which illustrates, with FIG. 10a, a fourth case of operation, we have shown four successive states of the file FPT0 at byte times t0 (e=1110), t0+1 (e=1111), t0+17 (e=1111) and t0 +18 (e=0000). At time t0, the waiting zone ZA is full and contains the word A*, B*, C, D, etc., X, and the transit zone ZT contains one word, obviously prioritized, P*. In the timing diagrams in the FIG. 10a, we have also shown these byte times. At the transition from time t0 to t0+1, the word A is normally read through the multiplexer MX then, toward the end of time t0+1, it is removed from the file and replaced by the word B* which is prioritized.

In fact, at time t0, the signal pp is at "1" as well as the signal FNV0. When e takes on the value 1111, the flip-flop B1 receives the signal VS0 from demultiplexer DMF and recopies the signal pp to "1", which results in setting the flip-flop B2 also at "1" through SB1. At time t0+1, on the leading edge of HL, that is at the moment where the word A is removed from the file the flip-flop B3 recopies the state pp1 from the flip-flop B2 and causes the state PP2 to change to "1". The word B* which has taken the place of A, being prioritized, the signal SP goes to "0" such that the output of gate P4 remains at "0" which through gate P5 brings back the signal A1 to "0". Thus at the next leading edges HL, up to t0+17, the word B* cannot be removed. During this time, the signal PP has come back to "0" and the first input of gate P3 is at "1", but as the signal SP is at "0", since the word B is prioritized, the flip-flop B1 is not reset to "0" by its CLR input and the state of flip-flops B2 and B3 do not change.

At time t0+17, where e retakes the value 0000, the word B* is read through the demultiplexer MX and by MNV, VP and DMF, the signal VS0 has gone to "1", which has resulted in the removal of word B*, such that at time t0+17, the word C appears at the output of the file. If we assume that between the time t0 and the time t0+17, no word has been written in the file, we are brought back to the first case of operation illustrated in FIGS. 8a and 8b. The word C is read at the time t0+33, etc.

In particular at time t0+17, the signal VS0 has caused the state of flip-flop B1 to change since pp is at "0". The flip-flops B2 and B3 are reset to "0" at time t0+18.

FIG. 11b illustrates with FIG. 11a, a fifth case of operation, in which are shown four successive states of the file FPT0 at byte times, t0 (e=1110), t0+1 (e=1111), t0+2 (e=0000) and t0+3 (e=0001). At time t0, the waiting zone ZA is full and contains the words A*, B, C, D, etc., X, and the transit zone ZT contains two words obviously prioritized, P* and Q*. In the timing diagrams of FIG. 11a, these byte times are also shown. At the transition of time t0 to t0+1, the word A* is normally read through the multiplexer MX then towards the end of time t0+1, it is removed from the file by the signal VS0 at "1" and replaced by the word B which is not prioritized. Thus at time t0+1, the word P* is entered into the zone ZA, but there remains the word Q* in the zone ZT.

In fact, at time t0, the signal pp is at "1" as well as the signal FNV0. When e takes on the value 1111, the flip-flop B1 recopies the signal pp at "1", which results in setting of the flip-flop B2 also at "1" then the flip-flop B3, as described above. The word B which has taken the place of A*, not being prioritized, the signal SP goes to "1", such that the gate P4 maintains the signal AL at "1". Thus at time t0+1, on the leading edge of HL, the word B is removed by shifting of the file. During this time, the word Q* is constantly in the transit zone ZT and the signal pp stays at "1", which maintains the state of the flip-flop B1 and thus the flip-flops B2 and B3. At time t0+3, since the word C is not prioritized, the signal SP remains at "1" and the gate P4 also maintains the signal AL at "1". Thus on the leading edge HL, the word C will also be removed, without being transmitted by the multiplexer MX. At the end of time t0+3, the signal pp is reset to "0", since the word Q* is entered in the zone ZA. The flip-flops B1 to B3 are thus reset to the initial state, as previously described, and the operation continues as in the previous case.

In FIG. 12b, which illustrates, with FIG. 12a, a sixth case of operation, we have shown five successive states of the file FPT0 at byte times t0 (e=1110), t0+1 (e=1111), t0+2 (e=0000), t0+17 (e=1111) and t0+18 (e=0000). At time t0, the waiting zone ZA is full and contains the words A*, B, C*, D, etc., X and the transit zone ZT contains two words P* and Q*. In the timing diagrams of FIG. 12a, we have also shown these byte times. At the transition from t0 to t0+1, the word A* is normally read through the multiplexer MX then, towards the end of time t0+1 it is removed from the file by the signal VS0 at "1" and replaced by the word B which is not prioritized. Thus, at time t0+1, the word P* is entered into the zone ZA, but the word Q* remains in the zone ZT.

In fact, at time t0, the signal pp is at "1" as well as signal FNV0. When, at time t0+1, e takes on the value 1111, the flip flop B1 recopies the signal pp to -"1", which also sets the flip-flop B2 to "1" then the flip-flop B3 as described above. The word B which has taken the place of the word A*, not being prioritized, the signal SP has gone to "1", such that the gate P4 maintains the signal AL at "1". Thus, at time t0+2, on the leading edge of HL, the word B is removed by shifting of the file. During this time, the word Q* being in the transit zone ZT, the signal pp having remained at "1", which maintained the state of flip-flop B1 and thus flip-flops B2 and B3. At time t0+3, which is not shown, since the word C* is prioritized, the signal pp goes to "0", which blocks gate P4. The word C* will not be removed on the leading edge HL during the time t0+3 but will be read through the multiplexer MX at t0+17, when it retakes the value 1111 which causes the generation of the signal VS0 by the demultiplexer DMF.

In other respects, at the end of time t0+2, the word Q* is entered into the zone ZE, while the zone ZT has become empty, which is caused by the signal pp going to "0". We are thus brought back to the first case of operation of this description. However the flip-flop B1 had kept its enable state, since the signal VS0 only appeared at time t0+17, and at the gate P3 had remained blocked by the signal SP set to level "0" indicating that the word C* was prioritized. At the start of time t0+17, the signals SB1, pp1 and pp2 are thus at "1". The signal VS0 resets the flip-flop B1 to the rest state and the flip-flops B1 and B2 changed states successively as described above in relation to the second case illustrated by FIGS. 8a and 8b.

In the previous examples of operation, it was assumed that during the operations, no new word entered into the file being processed. It is obvious that the case can occur, that at each byte time, a word can be written if the packet entering is intended for the output port concerned. A man skilled in the art understanding this description of the six particular cases of operation will certainly understand that the circuit CT0 to CT15 will treat them in the same manner.

In the embodiment of the routing circuit shown in FIG. 6, the wire which transmits the signal p1 is duplicated at the corresponding input of circuits CT0 to CT15. In the case of a packet entering into the switch and intended for a single output port, a single wire is quite suitable. In the case of an entering packet intended to be broadcast, that is, destined for a number of outgoing ports, designated by the individual wires of the bundle s, the wire p1 itself implies that the packet may or may not have a high semantic priority level for all the ports. For the case where it is desired that a packet broadcast should have a semantic priority for some of the outgoing ports and no semantic priority for others, it is necessary to provide sixteen individual wires p1 assigned to circuits CT0 to CT15, as the wires in the bundle s.

Of course, when the zone ZE of the file FPTi or FSPTi is full of semantically prioritized packet addresses and others arrive, the latter will not be transmitted. However the principal and the analysis of the traffic conditions make these circumstances extremely rare except in accident. For this subject, it is necessary to know the control unit of the switch used at each setup of the virtual circuit and thus know the average load of the outgoing port. In the case of too many links with high semantic priority levels requested for an outgoing port, this unit can defer some links to avoid bottlenecking.

We claim:

1. A system for switching information packets between entering time multiplex lines and outgoing time multiplex lines, said packets having two levels of semantic priority assigned thereto, buffer memory means, queueing file means, a storage address of a packet in said buffer memory means being stored in said queueing file means associated with each of said outgoing time multiplex lines designated to transmit the packets, said system comprising a field point memory for words having as many bits as there are outgoing time multiplex lines, the addresses of said field point memory corresponding to the address of said buffer memory means, each bit of said words being at "1" when the packets stored at the same address as said words and designated for an outgoing time multiplex line correspond to a high level semantic priority has not yet been transmitted by an outgoing multiplex line, each packet storage address being chosen from an address of the field point memory where all bits of said words are "0".

2. A system in accordance with claim 1, including means for write addressing the field point memory to modify the contents of the word, either by writing at the same address in the buffer memory means a packet with a high level semantic priority, or by reading at the same address in the buffer memory means a packet with a high level semantic priority, and write addressed between the write addressing, each word having all of its bits "0" when being read in the field point memory triggering a selection of their addresses from among free write addresses in the buffer memory means.

3. A system in accordance with claim 2 and a free address file, each free address in the field point memory being stored in said free address file, an output of said free address file generating stored addresses in the buffer memory means at the arrival rate of the packets.

4. A system in accordance with claim 3, and means for precluding a reading of the free address file when the entering packet is empty.

5. A system in accordance with any one of the claims 1–4 further including means for storing the storage address in each of the queueing file means, said storage address being accompanied by a first bit defining the semantic priority level of the packet, at least one waiting file comprising two zones in series between an input and an output, means for writing in a first of said two zones only when a second of said two zones is full, said first zone being accessible only to high level semantic priority packets, and means effective between two readings of each file for destroying the oldest read addresses of low semantic level priority packets which were stored earlier than the read address of a high level semantic prioritized packets, the destroyed oldest read addresses being equal in number to a maximum number of read addresses stored in the first zone.

6. A system in accordance with any one of the claims 1–4 for switching information packets having assigned levels of both semantic and timing priorities, said system further including means for storing the storage address in each queueing file means accompanied by a first bit defining the semantic priority level of the packet and a second bit defining the timing priority level of the packet, each queueing file means being comprised of two files, means for storing in the first file or in the second file responsive to the second bit, the first file storing all the packets with the high timing priority level and the second file being read only when the first file is empty.

7. A system in accordance with any one of the claims 1–4 and a test memory, a bit in said test memory corresponding to each word of the field point memory, said bit being a "1" when the corresponding word contains at least one bit at a "1" level, said test memory being read at a rate which is slight lower than the average frequency of a period of time during which the packets stay in the buffer memory means, an address file, the reading of a "1" bit in the test memory causing the writing of the address of a word corresponding to the field point memory into the address file.

8. A system in accordance with any of claims 1–4, further comprising an outgoing time multiplex line scanner, the field point memory having a data input connected to write enable selection wires of a storage address in the queueing file means, said selection wires being active during a first half byte duration, one bit write enable input being also connected to said selection wires and to the output of the outgoing time multiplex line scanner, a label translation memory, a first multiplexer, the scanner being enabled during the first bit period, the enabling being via first AND gates which individually pass the semantic priority bit coming from said label translation memory either at the output of the queueing file means being scanned or at an address input connected to the output of the first multiplexer, a binary cyclic counter, a second multiplexer, an address file, a first input of said first multiplexer being connected to the output of said binary cyclical counter and a second input of said first multiplexer being connected to the output of said second multiplexer, said second multiplexer having a first input which is connected to a data output of the queueing file means and having a second input connected to the output of the address file, the first multiplexer being controlled by said semantic priority bit and the second multiplexer being controlled during a second half byte period, and a data output connected to corresponding inputs of a NAND gate having an output connection to the write enable input of the address memory, and a data input on said address memory connected to the output of the binary cyclical counter, the data output of said binary cyclical counter generating the storages addresses.

9. A system in accordance with claim 5, for switching information packets having two levels of semantic priorities, and two levels of timing priorities, said system further including means for storing the storage address in each queueing file means accompanied by a first bit defining the semantic priority level of the packet and a second bit defining the timing priority level of the packet, each queueing file means being comprised of two files, means for storing into the first file or into the second file responsive to the second bit, the first file storing all the packets with the high timing priority level and the second file being read only when the first file is empty.

10. A system in accordance with any one of the claim 5 and a test memory, a bit in said test memory corresponding to each word of the field point memory, said bit being a "1" when the corresponding word contains at least one bit at a "1" level, said test memory being read at a rate which is slightly lower than the average frequency of a period of time during which the packets stay in the buffer memory means, an address file, the reading of a "1 " bit in the test memory causing the writing of the address of a word corresponding to the field point memory into the address file.

11. A system in accordance with any one of the claim 6 and a test memory, a bit in said test memory corresponding to each word of the field point memory, said bit being a "1" when the corresponding word contains at least one bit at a "1" level, said test memory being read at a rate which is slightly lower than the average frequency of a period of time during which the packets stay in the buffer memory means, an address file, the reading of a "1" bit in the test memory causing the writing of the address of a word corresponding to the field point memory into the address file.

12. A system in accordance with any of the claims 5, further comprising an outgoing time multiplex line scanner, the field point memory having a data input connected to write enable selection wires of a storage address in the queueing file means, said selection wires being active during a first half byte duration, one bit write enable input being also connected to said selection wires and to the output of the outgoing time multiplex line scanner, a label translation memory, a first multiplexer, the scanner being enabled during the first bit period, the enabling being via first AND gates which individually pass the semantic priority bit coming from said label translation memory either at the output of the queueing file means being scanned or at an address input connected to the output of the first multiplexer, a binary cyclic counter, a second multiplexer, an address file, a first input of said first multiplexer being connected to the output of said binary cyclical counter and a second input of said first multiplexer being connected to the output of said second multiplexer, said second multiplexer having a first input which is connected to a data output of the queueing file means and having a second input connected to the output of the address file, the first multiplexer being controlled by said semantic priority bit and the second multiplexer being controlled during a second half byte period, and a data output connected to corresponding inputs of a NAND gate having an output connection to the write enable input of the address memory, and a data input on said address memory connected to the output of the binary cyclical counter, the data output of said binary cyclical counter generating the storages addresses.

13. A system in accordance with any of claims 6, further comprising an outgoing time multiplex line scanner, the field point memory having a data input connected to write enable selection wires of storage address in the queueing field means, said selection wires being active during a first half byte duration, one bit write enable input being also connected to said selection wires and to the output of the outgoing time multiplex line scanner, a label translation memory, a first multiplexer, the scanner being enabled during the first bit period, the enabling being via first AND gates which individually pass the semantic priority bit coming from said label translation memory either at the output of the queueing file means being scanned or at an address input connected to the output of the first multiplexer, a binary cyclic counter, a second multiplexer, an address file, a first input of said first multiplexer being connected to the output of said binary cyclical counter and a second input of said first multiplexer being connected to the output of said second multiplexer, said second multiplexer having a first input which is connected to a data output of the queueing file means and having a second input connected to the output of the address file, the first multiplexer being controlled by said semantic priority bit and the second multiplexer being controlled during a second half byte, and a data output connected to corresponding inputs of a NAND gate having an output connection to the write enable input of the address memory, and a data input on said address memory connected to the output of the binary cyclical counter, the data output of said binary cyclical counter generating the storages addresses.

14. A system in accordance with any of claims 7, further comprising an outgoing time multiplex line scanner, the field point memory having a data input connected to write enable selection wires of a storage address in the queueing file means, said selection wires being active during a first half byte duration, one bit write enable input being also connected to said selection wires and to the output of the outgoing time multiplex line scanner, a label translation memory, a first multiplexer, the scanner being enabled during the first bit period, the enabling being via first AND gates which individually pass the semantic priority bit coming from said label translation memory either at the output of the queueing file means being scanned or at an address input connected to the output of the first multiplexer, a binary cyclic counter, a second multiplexer, an address file, a first input of said first multiplexer being connected to the output of said binary cyclical counter and a second input of said first multiplexer being connected to the output of said second multiplexer, said second multiplexer having a first input which is connected to a data output of the queueing file means and having a second input connected to the output of the address file, the first multiplexer being controlled by said semantic priority bit and the second multiplexer being controlled during a second half byte period, and a data output connected to corresponding inputs of a NAND gate having an output connection to the write enable input of the address memory, and a data input on said address memory connected to the output of the binary cyclical counter, the data output of said binary cyclical counter generating the storages addresses.

15. A system in accordance with any of claim 8, further comprising an outgoing time multiplex line scanner, the field point memory having a data input connected to write enable selection wires of a storage address in the queueing file means, said selection wires being active during a first half byte duration, one bit write enable input being also connected to said selection wires and to the output of the outgoing time multiplex line scanner, a label translation memory, a first multiplexer, the scanner being enabled during the first bit period, the enabling being via first AND gates which individually pass the semantic priority bit coming from said label translation memory either at the output of the queueing file means being scanned or at an address input connected to the output of the first multiplexer, a binary cyclic counter, a second multiplexer, an address file, a first input of said first multiplexer being connected to the output of said binary cyclical counter and a second input of said first multiplexer being connected to the output of said second multiplexer, said second multiplexer having a first input which is connected to a data output of the queueing file means and having a second input connected to the output of the address file, the first multiplexer being controlled by said semantic priority bit and the second multiplexer being controlled during a second half byte period, and a data output connected to corresponding inputs of a NAND gate having an output connection to the write enable input of the address memory, and a data input on said address memory connected to the output of the binary cyclical counter, the data output of said binary cyclical counter generating the storages addresses.

* * * * *